US012724120B2

(12) United States Patent
Zhao et al.

(10) Patent No.: US 12,724,120 B2
(45) Date of Patent: Sep. 1, 2026

(54) METHOD, DEVICE, SYSTEM, AND STORAGE MEDIUM FOR TRACKING MOVING TARGET

(71) Applicant: Kunming University of Science and Technology, Kunming (CN)

(72) Inventors: XuanZhi Zhao, Kunming (CN); Wen Zhang, Kunming (CN); ZengLi Liu, Kunming (CN); Kang Liu, Kunming (CN); HaiYan Quan, Kunming (CN); Yi Peng, Kunming (CN); JingMin Tang, Kunming (CN); YaoLian Song, Kunming (CN); Zheng Chen, Kunming (CN)

(73) Assignee: Kunming University of Science and Technology, Kunming (CN)

( * ) Notice: Subject to any disclaimer, the term of this patent is extended or adjusted under 35 U.S.C. 154(b) by 297 days.

(21) Appl. No.: 18/450,434

(22) Filed: Aug. 16, 2023

(65) Prior Publication Data

US 2024/0094343 A1 Mar. 21, 2024

(30) Foreign Application Priority Data

Sep. 9, 2022 (CN) ......................... 202211100279.1
Feb. 17, 2023 (CN) ......................... 202310136909.9
Mar. 31, 2023 (CN) ......................... 202310333694.X

(51) Int. Cl.
*G01S 7/41* (2006.01)
*G01S 13/58* (2006.01)
*G01S 13/66* (2006.01)

(52) U.S. Cl.
CPC .............. *G01S 7/415* (2013.01); *G01S 13/58* (2013.01); *G01S 13/66* (2013.01)

(58) Field of Classification Search
CPC .......... G01S 7/415; G01S 13/58; G01S 13/66; G01S 13/006; G01S 13/42; G01S 13/723
See application file for complete search history.

(56) References Cited

U.S. PATENT DOCUMENTS

2018/0095103 A1* 4/2018 Hirai ....................... G01S 13/42

FOREIGN PATENT DOCUMENTS

CN 114882070 A * 8/2022 ............. G06T 7/246

OTHER PUBLICATIONS

Recent developments on target tracking problems A review, Manav Kumar, Ocean Engineering, vol. 236, 2021, 109558, ISSN 0029-8018, (Year: 2021).*

* cited by examiner

*Primary Examiner* — Jack W Keith
*Assistant Examiner* — Clayton Paul Ridder
(74) *Attorney, Agent, or Firm* — Hemisphere Law, PLLC

(57) ABSTRACT

A method, device, system, and storage medium for tracking a moving target are provided. The method uses three-dimensional radar observation data to construct a state vector and a motion model of the moving target, thereby to construct a state equation and an observation equation for achieving filtering and tracking within a linear Gaussian framework. The disclosure is also suitable for a moving target in a two-dimensional scene with a distance and an azimuth, and the disclosure use a two-dimensional observation vector to construct a dynamic system to achieving tracking of the moving target. The disclosure can be used in radar systems containing Doppler measurements, and tracking of moving targets can be implemented by performing dimension-expansion processing on observation equations.

11 Claims, 7 Drawing Sheets

METHOD, DEVICE, SYSTEM, AND STORAGE MEDIUM FOR TRACKING MOVING TARGET

TECHNICAL FIELD

The disclosure relates to the field of radar detection technology, in particular to a method, a device, a system, and a storage medium for tracking a moving target.

BACKGROUND

Target tracking based on three-dimensional detection radar is a basic problem in the field of information fusion, which is a core and necessary module to navigate, monitor, control and attack moving targets in the air, on the ground and underwater, and has been a hot research issue for scholars. Effectively detecting all kinds of targets in three-dimensional space and continuously obtaining the position, speed, category and other information of interested targets are not only the premise of defending and attacking invading aircraft and missiles but also play an important role in civil fields such as autonomous driving, air traffic control, unmanned aerial vehicle (UAV) control and so on.

In a linear Gaussian system, the Kalman filtering algorithm uses a predicted value of a state equation to update the minimum mean square error estimation of the system state through the observation data obtained by the system. Since the Kalman filtering algorithm was proposed in the 1960s, it has been widely used in communication systems, power systems, aerospace, industrial control and other fields. However, in the two-dimensional radar target tracking, the radar obtains the information about the target, such as distance, angle, Doppler velocity and so on, the information about the target not only has a certain error, but also has a nonlinear relationship with the state of the target in the natural coordinate system (Cartesian coordinate system). On the basis of Kalman filtering algorithm, various nonlinear filtering techniques have been developed. In the case of high radar detection accuracy, these nonlinear filtering methods have been able to obtain considerable positioning and tracking performance. Compared with the two-dimensional detection radar, the three-dimensional detection radar can obtain an additional pitch angle observation value of the target relative to the radar, the pitch angle observation value has a strong nonlinear relationship with the state of the target in the three-dimensional Cartesian coordinate system. Especially in scenes with a long distance and a large observation error, a classical nonlinear filtering method even diverges. At present, deep neural networks and various machine learning algorithms are popular, many scholars have tried to introduce some methods using deep neural networks and machine learning algorithms in the field of moving target tracking, but a significant problem of these attempts is the high computational complexity of these methods, and moving target tracking has a high demand for real-time, in addition, these methods need to use large data for training in a long time. Scalability of these methods in different environments is also limited, and the stability of these methods has not yet been clearly studied. Therefore, in the next five to ten years, practical application prospects of moving target tracking and positioning methods based on neural networks are not clear. Considering the universality of three-dimensional radar in tracking scenarios, how to innovate new methods to improve the robustness and accuracy of three-dimensional detection radar target tracking without increasing computational complexity compared to existing methods is a highly practical and theoretical innovation issue.

SUMMARY

The disclosure aims to solve the above problems existing in the related art, and thus the disclosure provides a method, device, system, and storage medium for tracking a moving target. The method for tracking the moving target uses three-dimensional radar observation data to construct a state vector and a motion model of the moving target, thereby to construct a state equation and an observation equation for achieving filtering and tracking within a linear Gaussian framework. The disclosure is also suitable for a moving target in a two-dimensional scene with a distance and an azimuth, and the disclosure uses a two-dimensional observation vector to construct a dynamic system to achieve tracking of the moving target. The disclosure can be used in radar systems containing Doppler measurements, and tracking of moving targets can be implemented by performing dimension-expansion processing on observation equations.

A first technical solution of the disclosure provides a method for tracking a moving target, and the method includes following steps 1~7.

Step 1: constructing a state equation and an observation equation based on three-dimensional radar observation data.

Step 2: initializing a transforming state of the moving target to obtain an initial state of the moving target when k=1.

Step 3: calculating a time-varying state-transition matrix, a time-varying noise-driven matrix, and statistical characteristics of a process noise at a moment k based on the initial state of the moving target when k=2; and calculating a time-varying state-transition matrix, a time-varying noise-driven matrix, and statistical characteristics of a process noise at a moment k based on a posteriori estimation (the posteriori estimation includes a posteriori state estimation and a posteriori state covariance) of the moving target at a moment k−1 when k>2.

Step 4: performing, based on the state equation at the moment k, one-step prediction on a state of the moving target at the moment k, thereby to obtain a prediction state of the moving target at the moment k.

Step 5: acquiring observation data at the moment k of a three-dimensional detection radar, and performing dimension-expansion processing on the acquired observation data at the moment k of the three-dimensional detection radar, thereby to obtain dimension-expansion data.

Step 6: performing fusion filtering on the prediction state of the moving target at the moment k and the dimension-expansion data based on a minimum variance estimation theory, thereby to obtain a posteriori estimation of the moving target at the moment k.

Step 7: progressing the moment k to a moment k+1 for further tracking of the moving target.

In an embodiment, the constructing the state equation and the observation equation based on the three-dimensional radar observation data includes:

for the moving target with a constant velocity, using the three-dimensional radar observation data including a distance, an azimuth, a pitch angle, a first derivative of the distance, a first derivative of the azimuth, and a first derivative of the pitch angle (i.e., a distance, an azimuth, a pitch angle, a Doppler velocity, an azimuth angular velocity, and a pitch angular velocity) as parameters to construct a transformation state space; based on kinematic characteristics of the moving target with the constant velocity, using a radar tracking system to analyze the moving target with the constant velocity, thereby to construct the state equation and the observation equation in the transformation state space; the state equation and the observation equation being expressed as follows:

$$\xi(k)=A_{CV}(k)\cdot\xi(k-1)+B_{CV}(k)\cdot u(k)$$

$$Z(k)=H\cdot\xi(k)+w(k)$$

where $\xi(k)=[\phi(k)\ \phi'(k)\ r(k)\ r'(k)\ \theta(k)\ \theta'(k)]^T$ represents a state vector constructed directly from the three-dimensional radar observation data; $\phi(k)$, $\phi'(k)$, $r(k)$, $r'(k)$, $\theta(k)$, and $\theta'(k)$ respectively represent a pitch angle, a pitch angular velocity, a distance, a Doppler velocity, an azimuth, and an azimuth angular velocity of the moving target relative to the three-dimensional detection radar at the moment k; $A_{CV}(k)$, $B_{CV}(k)$, u(k) and H respectively represent the time-varying state-transition matrix, the time-varying noise-driven matrix, a process noise, and an observation matrix; where $$u(k)=\left[v'_\phi(k)\, r''(k)\, v'_\theta(k)\right]^T,\ v'_\phi(k),\ r''(k)\ \text{and}\ v'_\theta(k)$$

respectively represent a process noise in a meridional direction, a process noise in a radial direction, and a process noise in an azimuthal direction; Z(k) represents a radar observation value interfered by noises at the moment k, including a distance, an azimuth, and a pitch angle of the moving target relative to the three-dimensional detection radar under interferences of the noises at the moment k; $w(k)=[\tilde{\phi}(k)\ \tilde{r}(k)\ \tilde{\theta}(k)]^T$ represents an observation noise of the three-dimensional detection radar at the moment k, where $\tilde{\phi}(k)$, $\tilde{r}(k)$ and $\tilde{\theta}(k)$ respectively represent a pitch angular noise, a distance noise, and an azimuth noise; $\tilde{\phi}(k)$, $\tilde{r}(k)$, and $\tilde{\theta}(k)$ are all white Gaussian noises with a mean value of zero; variances of the pitch angular noise, the distance noise, and the azimuth noise respectively are delta_$\phi$, delta_r, and delta_$\theta$, and a noise covariance matrix is expressed as follows:

$$R(k)=\begin{bmatrix} \text{delta\_}\phi & 0 & 0 \\ 0 & \text{delta\_r} & 0 \\ 0 & 0 & \text{delta\_}\theta \end{bmatrix}.$$

In an embodiment, the initializing the transforming state of the moving target to obtain the initial state of the moving target when k=1 includes:

for the moving target, initializing a state $\xi(0)$ and a covariance P(0) of the moving target based on prior information of the moving target in the Cartesian coordinate system:

assuming $\xi(0)=[\phi(0)\ \phi'(0)\ r(0)\ r'(0)\ \theta(0)\ \theta'(0)]^T$, then $$\phi(0)=\arctan\left(\frac{z}{\sqrt{x^2+y^2}}\right)+p_\phi$$

$$v_\phi=\frac{x'xz}{\sqrt{x^2+y^2}\sqrt{x^2+y^2+z}}+\frac{y'yz}{\sqrt{x^2+y^2}\sqrt{x^2+y^2+z}}+\frac{z'\sqrt{x^2+y^2}}{\sqrt{x^2+y^2+z}}+p_{v_\phi}$$

$$\phi'(0)=v_\phi/r(0)$$

$$r(0)=\sqrt{x^2+y^2+z^2}+p_r$$

$$r'(0)=\frac{x'x}{\sqrt{x^2+y^2+z^2}}+\frac{y'y}{\sqrt{x^2+y^2+z^2}}+\frac{z'z}{\sqrt{x^2+y^2+z^2}}+p_{r'}$$

$$\theta(0)=\arctan(y/x)+p_\theta$$

$$\theta'(0)=-\frac{x'y}{\sqrt{x^2+y^2}}+\frac{y'x}{\sqrt{x^2+y^2}}+p_{\theta'}$$

-continued $$P(0)=\begin{bmatrix} \sigma_\phi & 0 & 0 & 0 & 0 & 0 \\ 0 & \frac{\sigma_{\phi'}}{r(0)^2}+\frac{\sigma_r v_{\phi'}^2}{r(0)^4} & 0 & 0 & 0 & 0 \\ 0 & 0 & \sigma_r & 0 & 0 & 0 \\ 0 & 0 & 0 & \sigma_{r'} & 0 & 0 \\ 0 & 0 & 0 & 0 & \sigma_\theta & 0 \\ 0 & 0 & 0 & 0 & 0 & \sigma_{\theta'} \end{bmatrix}$$

where $p_\phi$, $p_{v_\phi}$, $p_r$, $p_{r'}$, $p_\theta$, and $p_{\theta'}$ are all Gaussian distributions that follow a mean value of zero; and variances of $p_\phi$, $p_{v_\phi}$, $p_r$, $p_{r'}$, $p_\theta$, and $p_{\theta'}$ respectively are $\sigma_{v_\phi}$, $\sigma_{v_\phi'}$, $\sigma_r$, $\sigma_{r'}$, $\sigma_\theta$, and $\sigma_{\theta'}$.

In an embodiment, the performing, based on the state equation at the moment k, the one-step prediction on the state of the moving target at the moment k, thereby to obtain the prediction state of the moving target at the moment k includes:

using the state equation at the moment k in the transformation state space to perform the one-step prediction on the state and a variance at the moment k, and equations of performing the one-prediction being expressed as follows:

$$\xi(k,k-1)=A_{CV}(k)\xi(k-1,k-1)$$

$$P(k,k-1)=A_{CV}(k)P(k-1,k-1)A_{CV}(k)^T+B_{CV}(k)D(u(k))B_{CV}(k)^T$$

where $\xi(k,k-1)$ and $P(k,k-1)$ respectively represent the prediction state of the moving target at the moment k and the prediction variance of the moving target at the moment k, and D(u(k)) represents a process noise covariance matrix.

In an embodiment, the acquiring the observation data at the moment k of the three-dimensional detection radar, and performing the dimension-expansion processing on the acquired observation data at the moment k of the three-dimensional detection radar, thereby to obtain the dimension-expansion data includes:

acquiring the observation data at the moment k of the three-dimensional detection radar, performing the dimension-expansion processing on a radar observation value interfered by noises and a noise covariance matrix at the moment k, and equations of performing the dimension-expansion processing being expressed as follows:

$$Z_e(k)=E\times Z(k)$$

$$R_e(k)=ER(k)E^T$$

where $$E=\begin{bmatrix} 1 & 0 & 0 \\ 0 & 0 & 0 \\ 0 & 1 & 0 \\ 0 & 0 & 0 \\ 0 & 0 & 1 \\ 0 & 0 & 0 \end{bmatrix}$$

represents a dimension-expansion matrix, $Z_e(k)$ represents a dimension-expansion vector, and $R_e(k)$ represents a covariance matrix of the dimension-expansion vector.

In an embodiment, the performing the fusion filtering on the prediction state at the moment k and the dimension-expansion data based on the minimum variance estimation theory, thereby to obtain the posteriori estimation of the moving target at the moment k includes:

performing the fusion filtering on the prediction state of the moving target at the moment k and the dimension-expansion data based on the minimum variance estimation theory, thereby to obtain a posteriori state estimation and a posteriori state covariance of the moving target at the moment k, and equations of performing the fusion filtering being expressed as follows:

$$\xi(k,k)=(P(k,k-1)^{-1}+R_e(k)^{-1})^{-1}(P(k,k-1)^{-1}\xi(k,k-1)+R_e(k)^{-1}Z_e(k))$$

$$P(k,k)=(P(k,k-1)^{-1}+R_e(k)^{-1})^{-}$$

In an embodiment, the calculating the time-varying state-transition matrix, the time-varying noise-driven matrix, and the statistical characteristics of the process noise at the moment k based on the initial state of the moving target when k=2; and calculating the time-varying state-transition matrix, the time-varying noise-driven matrix, and the statistical characteristics of the process noise at the moment k based on the posteriori estimation of the moving target at the moment k−1 when k>2 includes:

for the moving target with a constant velocity, using following equations to calculate parameters of the state equation and the observation equation at the moment k based on the posteriori estimation of the moving target at the moment k−1:

$$A_{CV}(k)=\begin{bmatrix} 1 & T & 0 & 0 & 0 & 0 \\ 0 & 1-T\frac{r(k-1)'}{r(k-1)} & 0 & 0 & 0 & 0 \\ 0 & 0 & 1 & T & 0 & 0 \\ 0 & 0 & 0 & 1 & 0 & 0 \\ 0 & 0 & 0 & 0 & 1 & T \\ 0 & 0 & 0 & 0 & 0 & 1+T\left(\tan\phi(k-1)\phi'(k-1)-\frac{r'(k-1)}{r(k-1)}\right) \end{bmatrix}$$

$$B_{CV}(k)=\begin{bmatrix} 0 & 0 & 0 \\ \frac{T}{r(k-1)} & 0 & 0 \\ 0 & \frac{1}{2}T^2 & 0 \\ 0 & T & 0 \\ 0 & 0 & 0 \\ 0 & 0 & \frac{T}{r(k-1)\cos\phi(k-1)} \end{bmatrix}$$

$$H=\begin{bmatrix} 1 & 0 & 0 & 0 & 0 & 0 \\ 0 & 0 & 1 & 0 & 0 & 0 \\ 0 & 0 & 0 & 0 & 1 & 0 \end{bmatrix}$$

$$D(u(k))=G(k)QG(k)^T$$

$$G(k)=\begin{bmatrix} \cos\theta(k)\sin\phi(k) & \sin\theta(k)\sin\phi(k) & \cos\phi(k) \\ \cos\theta(k)\cos\phi(k) & \cos\theta\cos\phi & \sin\phi(k) \\ -\sin\theta(k) & \cos\theta(k) & 0 \end{bmatrix}$$

where, T represents a radar sampling interval time; r(k−1), r'(k−1), θ(k−1) and ϕ(k−1) respectively represent posteriori estimations of a distance, a Doppler velocity, an azimuth, and a pitch angle at the moment k−1; Q=diag ($q_x$ $q_y$ $q_z$) represents a process noise in a Cartesian coordinate system, and $q_x$, $q_y$, and $q_z$ respectively represent white Gaussian noise variances in X, Y, and Z axes; G (k) represents a process noise transition matrix at the moment k; and D(u(k)) represents a process noise covariance matrix (also referred to as the statistical characteristics of the process noise) at the moment k.

A second technical solution of the disclosure provides a device for tracking a moving target, and the device includes:

a constructing module, configured to construct a state equation and an observation equation based on three-dimensional radar observation data;

an initializing module, configured to initialize a transforming state of the moving target to obtain an initial state of the moving target when k=1;

a calculating module, configured to calculate a time-varying state-transition matrix, a time-varying noise-driven matrix, and noise statistical characteristics of the state equation of a moment k based on a posteriori estimation of the moving target at a moment k−1;

a prediction module, configured to perform one-step prediction on a state of the moving target at the moment k based on the state equation at the moment k, thereby obtain a prediction state of the moving target at the moment k;

a dimension-expansion module, configured to acquire observation data at the moment k of a three-dimensional detection radar and perform dimension-expansion processing on the acquired observation data at the moment k of the three-dimensional detection radar, thereby to obtain dimension-expansion data;

a fusion filtering module, configured to perform fusion filtering on the prediction state of the moving target at the moment k and the dimension-expansion data based on a minimum variance estimation theory, thereby to obtain a posteriori estimation of the moving target at the moment k; and a tracking module, configured to progressing the moment k to a moment k+1 for further tracking of the moving target.

A third technical solution of the disclosure provides a system for tracking a moving target, and the system includes: a memory, configured to store a computer program; and a processor, configured to execute the computer program to implement the above method.

A fourth technical solution of the disclosure provides a non-transitory computer-readable storage medium storing instructions, and the above method is executed when the instructions are executed by a processor.

The method, device, system, and storage medium for tracking the moving target of the disclosure have following beneficial effects.

The disclosure relates to a tracking technology which uses fusion filtering based on a minimum variance estimation theory to achieve state transformation of a moving target tracked by a three-dimensional radar. The tracking technology uses three-dimensional radar observation data and first derivatives of the three-dimensional radar observation data to construct a motion state (abbreviated as a state) the moving target, thereby constructing a state differential equation based on kinematic characteristics of the moving target, and a three-dimensional linear analytic state equation of the moving target is obtained by solving the state differential equation. The analytic state equation not only accords with the motion characteristics of the moving target, but also the state of the moving target in the analytic state equation contains three-dimensional radar observation data, namely, the analytic state equation has a linear relationship with the radar observation data, then the tracking of the moving target is directly completed by using a minimum variance estimation which can reach the lower limit of the Cramer-Rao performance under a linear condition, thereby solving the strong nonlinear problem in the three-dimensional radar tracking. The disclosure adaptively constructs a more reasonable and effective fusion space at the data-level signal scene, provides new solutions that have not been noticed by previous researchers, and improves the robustness and accuracy of tracking without increasing the computational complexity of tracking. For a two-dimensional scene in which a moving target has a constant height, a pitch angle of the moving target is set to be 0, and the dimension of a dynamic system is reduced, so that the tracking of the moving target can be achieved by the disclosure.

BRIEF DESCRIPTION OF DRAWINGS

In the drawings which are not necessarily drawn to scale, the same reference numbers may describe the same components in different views. The same reference number with a letter suffix or a different letter suffix may refer to different instances of similar components. The drawings illustrate various embodiments by way of example, not by way of limitation, and together with the description and claims, serve to explain the embodiments of the disclosure. Where appropriate, the same reference numbers used in the drawings refer to the same or similar components. Embodiments in the following description are illustrative and are not intended to a scope of protection of the disclosure.

DETAILED DESCRIPTION OF EMBODIMENTS

Figure 1:
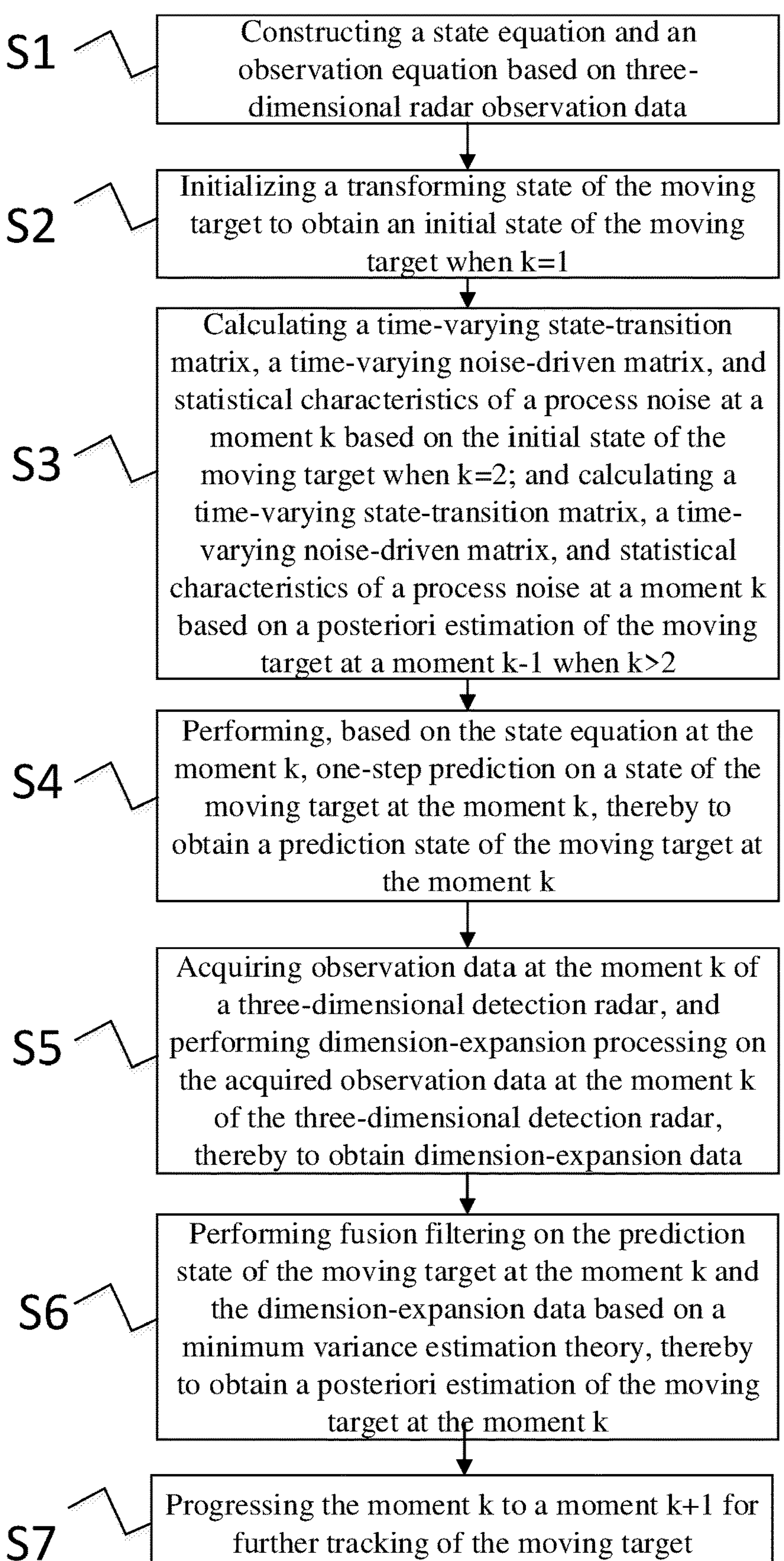
FIG. 1 illustrates a flowchart of a method for tracking a moving target in the disclosure.
Figure 2:
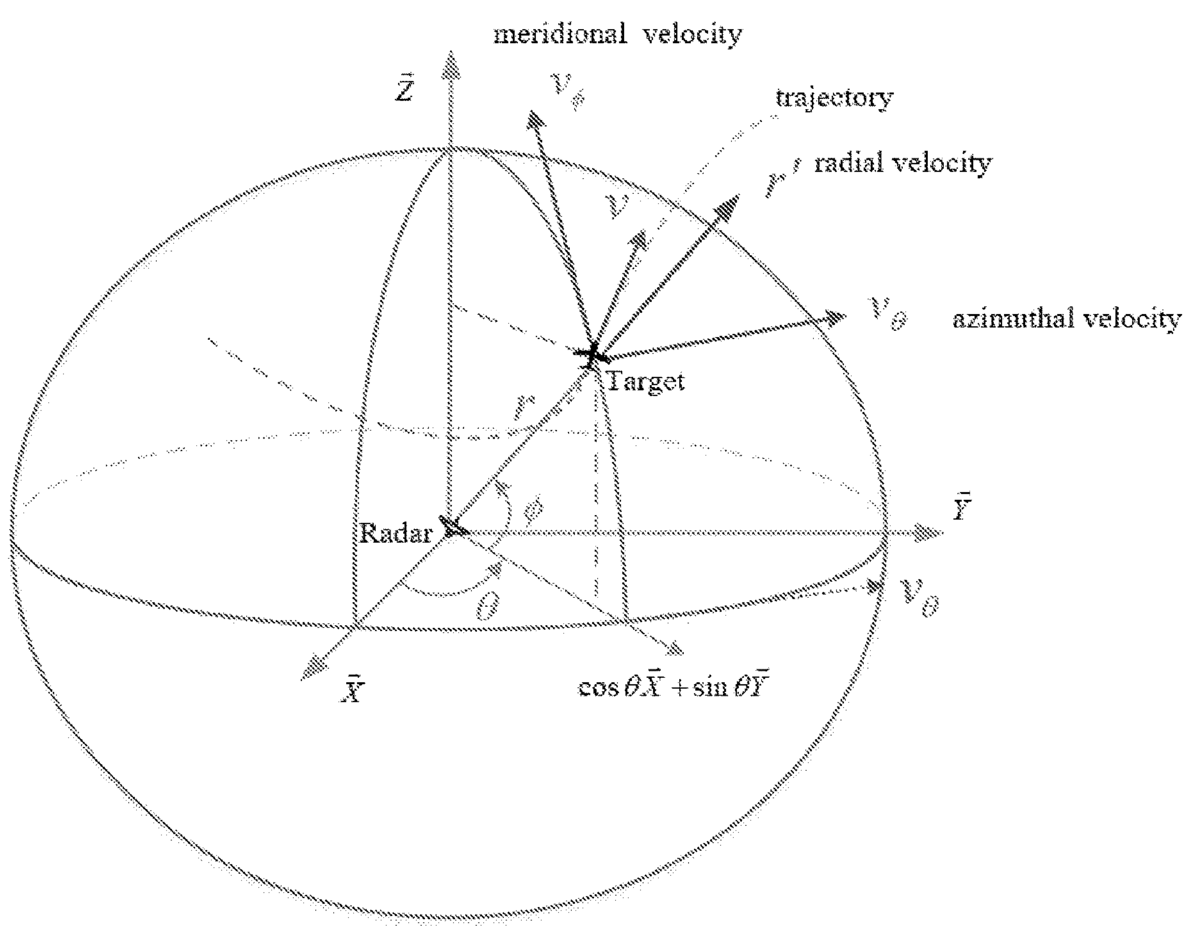
FIG. 2 illustrates a schematic diagram of constructing of a state and fusion space of the moving target based on three-dimensional radar observation data in the disclosure. The disclosure uses a distance, an azimuth, and a pitch angle to describe a position of the moving target, and uses a Doppler velocity, an azimuth tangential velocity, and a pitch tangential velocity to describe a velocity of the moving target.

In order for those skilled in the art to better understand the technical solution of the disclosure, the following is a detailed description of the disclosure with reference to the drawings and the specific embodiments. The disclosure will be described in further detail below with reference to the drawings and specific embodiments, but not the drawings and specific embodiments should not be considered as a limitation of the disclosure. The order of the steps described herein as an example should not be considered as a limitation if there is no necessity of a contextual relationship between each other, and those skilled in the art should understand that the order can be adjusted as long as the logic of the steps is not destroyed and the disclosure can be realized.

A method for tracking a moving target is provided in an embodiment of the disclosure, and the method includes following steps 1~7.

Step 1: constructing a state equation and an observation equation based on three-dimensional radar observation data.

Specifically, the step 1 includes: for the moving target with a constant velocity, using the three-dimensional radar observation data including a distance, an azimuth, a pitch angle, a first derivative of the distance, a first derivative of the azimuth, and a first derivative of the pitch angle (i.e., a distance, an azimuth, a pitch angle, a Doppler velocity, an azimuth angular velocity, and a pitch angular velocity) as parameters to construct a transformation state space; based on kinematic characteristics of the moving target with the constant velocity, using a radar tracking system to analyze the moving target with the constant velocity, thereby to construct the state equation and the observation equation in the transformation state space; the state equation and the observation equation being expressed as follows:

$$\xi(k)=A_{CV}(k)\cdot\xi(k-1)+B_{CV}(k)\cdot u(k)$$

$$Z(k)=H\cdot\xi(k)+w(k)$$

where $\xi(k)=[\phi(k)\ \phi'(k)\ r(k)\ r'(k)\ \theta(k)\ \theta'(k)]^T$ represents a state vector constructed directly from the three-dimensional radar observation data; $\phi(k)$, $\phi'(k)$, $r(k)$, $r'(k)$, $\theta(k)$, and $\theta'(k)$ respectively represent a pitch angle, a pitch angular velocity, a distance, a Doppler velocity, an azimuth, and an azimuth angular velocity of the moving target relative to the three-dimensional detection radar at the moment k; $A_{CV}(k)$, $B_{CV}(k)$, $u(k)$ and H respectively represent the time-varying state-transition matrix, the time-varying noise-driven matrix, a process noise, and an observation matrix; where $$u(k)=\left[v'_{\phi}(k)\ r''(k)\ v'_{\theta}(k)\right]^T,\ v'_{\phi}(k),\ r''(k)\text{ and }v'_{\theta}(k)$$

respectively represent a process noise in a meridional direction, a process noise in a radial direction, and a process noise in an azimuthal direction; Z(k) represents a radar observation value interfered by noises at the moment k, including a distance, an azimuth, and a pitch angle of the moving target relative to the three-dimensional detection radar under interferences of the noises at the moment k; $w(k)=[\tilde{\phi}(k)\ \tilde{r}(k)\ \tilde{\theta}(k)]^T$ represents an observation noise of the three-dimensional detection radar at the moment k, where $\tilde{\phi}(k)$, $\tilde{r}(k)$ and $\tilde{\theta}(k)$ respectively represent a pitch angular noise, a distance noise, and an azimuth noise; $\tilde{\phi}(k)$, $\tilde{r}(k)$, and $\tilde{\theta}(k)$ are all white Gaussian noises with a mean value of zero; variances of the pitch angular noise, the distance noise, and the azimuth noise respectively are delta_ϕ, delta_r, and delta_θ; and a noise covariance matrix is expressed as follows:

$$R(k)=\begin{bmatrix}\text{delta\_}\phi & 0 & 0\\ 0 & \text{delta\_r} & 0\\ 0 & 0 & \text{delta\_}\theta\end{bmatrix}.$$

Step 2: initializing a transforming state of the moving target to obtain an initial state of the moving target when k=1.

Specifically, the step 2 includes: for the moving target, initializing a state $\xi(0)$ and a covariance $P(0)$ of the moving target based on prior information of the moving target in a Cartesian coordinate system.

In some embodiments, a specific implementation method of initializing a state $\xi(0)$ and a covariance $P(0)$ of the moving target based on prior information of the moving target in a Cartesian coordinate system includes:

assuming $\xi(0)=[\phi(0)\ \phi'(0)\ r(0)\ r'(0)\ \theta(0)\ \theta'(0)]^T$, then $$\phi(0) = \arctan\left(\frac{z}{\sqrt{x^2+y^2}}\right) + p_\phi$$

$$v_\phi = \frac{x'xz}{\sqrt{x^2+y^2}\sqrt{x^2+y^2+z}} + \frac{y'yz}{\sqrt{x^2+y^2}\sqrt{x^2+y^2+z}} + \frac{z'\sqrt{x^2+y^2}}{\sqrt{x^2+y^2+z}} + p_{v_\phi}$$

$$\phi'(0) = v_\phi / r(0)$$

$$r(0) = \sqrt{x^2+y^2+z^2} + p_r$$

$$r'(0) = \frac{x'x}{\sqrt{x^2+y^2+z^2}} + \frac{y'y}{\sqrt{x^2+y^2+z^2}} + \frac{z'z}{\sqrt{x^2+y^2+z^2}} + p_{r'}$$

$$\theta(0) = \arctan(y/x) + p_\theta$$

$$\theta'(0) = -\frac{x'y}{\sqrt{x^2+y^2}} + \frac{y'x}{\sqrt{x^2+y^2}} + p_{\theta'}$$

$$P(0) = \begin{bmatrix} \sigma_\phi & 0 & 0 & 0 & 0 & 0 \\ 0 & \frac{\sigma_{\phi'}}{r(0)^2} + \frac{\sigma_r v_{\phi'}^2}{r(0)^4} & 0 & 0 & 0 & 0 \\ 0 & 0 & \sigma_r & 0 & 0 & 0 \\ 0 & 0 & 0 & \sigma_{r'} & 0 & 0 \\ 0 & 0 & 0 & 0 & \sigma_\theta & 0 \\ 0 & 0 & 0 & 0 & 0 & \sigma_{\theta'} \end{bmatrix}$$

where $p_\phi$□$N(0,\sigma_\phi)$, $p_{v_\phi}$□$N(0,\sigma_{v_\phi})$, $p_r$□$N(0,\sigma_r)$, $p_{r'}$□$N(0,\sigma_{r'})$, $p_\theta$□$N(0,\sigma_\theta)$, and $p_{\theta'}$□$N(0,\sigma_{\theta'})$ are all Gaussian distributions that follow a mean value of zero.

Step 3: calculating a time-varying state-transition matrix, a time-varying noise-driven matrix, and statistical characteristics of a process noise at a moment k based on the initial state of the moving target when k=2; and calculating a time-varying state-transition matrix, a time-varying noise-driven matrix, and statistical characteristics of a process noise at a moment k based on a posteriori estimation of the moving target at a moment k−1 when k>2 (in other words, a previous moment relative to the moment k).

Specifically, for a moment k=1, 2, 3, . . . , a time-varying state-transition matrix, a time-varying noise-driven matrix of the state equation, and statistical characteristics of the process noise (also referred to as a process noise covariance matrix) are calculated in a transformation state space at the moment k. A state of the moving target at a moment k=1 is an initial state of the moving target. Furthermore, the state of the moving target at a moment k=2 is calculated based on the initial state (i.e., the state of the moving target at the moment k=1), and the state of the moving target at a moment k=3 is calculated based on a posteriori estimation of the moving target at the moment k=2; for the later state of the moving target at a moment k (k>3), the state of the moving target at the moment k is calculated based on a posteriori estimation of the moving target at a moment k−1. (also referred to as a previous moment relative to the moment k)

In step 3 with common three-dimensional scenes, for the moving target with a constant velocity, following equations are used to calculate parameters of the state equation and the observation equation at the moment k based on the posteriori estimation of the moving target at the moment k−1:

$$A_{CV}(k) = \begin{bmatrix} 1 & T & 0 & 0 & 0 & 0 \\ 0 & 1 - T\frac{r(k-1)'}{r(k-1)} & 0 & 0 & 0 & 0 \\ 0 & 0 & 1 & T & 0 & 0 \\ 0 & 0 & 0 & 1 & 0 & 0 \\ 0 & 0 & 0 & 0 & 1 & T \\ 0 & 0 & 0 & 0 & 0 & 1 + T\left(\tan\phi(k-1)\phi'(k-1) - \frac{r'(k-1)}{r(k-1)}\right) \end{bmatrix}$$

$$B_{CV}(k) = \begin{bmatrix} 0 & 0 & 0 \\ \frac{T}{r(k-1)} & 0 & 0 \\ 0 & \frac{1}{2}T^2 & 0 \\ 0 & T & 0 \\ 0 & 0 & 0 \\ 0 & 0 & \frac{T}{r(k-1)\cos\phi(k-1)} \end{bmatrix}$$

$$D(u(k)) = G(k)QG(k)^T$$

$$G(k) = \begin{bmatrix} \cos\theta(k)\sin\phi(k) & \sin\theta(k)\sin\phi(k) & \cos\phi(k) \\ \cos\theta(k)\cos\phi(k) & \sin\theta\cos\phi & \sin\phi(k) \\ -\sin\theta(k) & \cos\theta(k) & 0 \end{bmatrix}$$

where, T represents radar sampling interval time, $r(k-1)$, $r'(k-1)$, $\theta(k-1)$ and $\phi(k-1)$ respectively represent posteriori estimations of a distance, a Doppler velocity, an azimuth, and a pitch angle at the moment k−1; $Q=\mathrm{diag}(q_x\ q_y\ q_z)$ represents a process noise in a Cartesian coordinate system, $q_x$, $q_y$, and $q_z$ respectively represent white Gaussian noise variances in X, Y, and Z axes; $G(k)$ represents a process noise transition matrix at the moment k; and $D(u(k))$ represents a process noise covariance matrix at the moment k.

In the step 3 with common three-dimensional scenes, for the moving target with a constant acceleration, following equations are used to calculate parameters of the state equation and the observation equation at the moment k based on the posteriori estimation of the moving target at the moment k−1:

a state vector is expressed as follows:

$$\xi(k)=[\phi(k)\phi'(k)\phi''(k)r(k)r'(k)r''(k)\theta(k)\theta'(k)\theta''(k)]^T;$$

a time-varying state-transition matrix $A_{CA}(k)$ is expressed as follows:

$$A_{CA}(k) = \begin{bmatrix} 1 & T & 0 & 0 & 0 & 0 & 0 & 0 & 0 \\ 0 & 1 & T & 0 & 0 & 0 & 0 & 0 & 0 \\ 0 & -\frac{Tr(k-1)''}{r(k-1)} & 1 - 2T\frac{r(k-1)'}{r(k-1)} & 0 & 0 & 0 & 0 & 0 & 0 \\ 0 & 0 & 0 & 1 & T & \frac{1}{2}T^2 & 0 & 0 & 0 \\ 0 & 0 & 0 & 0 & 1 & T & 0 & 0 & 0 \\ 0 & 0 & 0 & 0 & 0 & 1 & 0 & 0 & 0 \\ 0 & 0 & 0 & 0 & 0 & 0 & 1 & T & 0 \\ 0 & 0 & 0 & 0 & 0 & 0 & 0 & 1 & T \\ 0 & 0 & 0 & 0 & 0 & 0 & 0 & a_{98} & a_{99} \end{bmatrix}$$

where $$a_{98} = T\frac{2r(k-1)'\tan\phi(k-1)\phi(k-1)' + r(k-1)\phi(k-1)' + r(k-1)\tan\phi(k-1)\phi(k-1)'' - r(k-1)''}{r(k-1)}$$

and $a_{99} = 1 + T\frac{2r(k-1)\tan\phi(k-1)\phi(k-1)' - 2r(k-1)'}{r(k-1)}$;

a time-varying noise-driven matrix $B_{CA}(k)$ is as follows:

$$B_{CA}(k) = \begin{bmatrix} 0 & 0 & 0 \\ 0 & 0 & 0 \\ \frac{T}{r(k-1)} & 0 & 0 \\ 0 & \frac{1}{6}T^3 & 0 \\ 0 & \frac{1}{2}T^2 & 0 \\ 0 & T & 0 \\ 0 & 0 & 0 \\ 0 & 0 & 0 \\ 0 & 0 & \frac{T}{r(k-1)\cos\phi(k-1)} \end{bmatrix};$$

and other equations used to remained parameters are similar with the moving target with the constant velocity.

In the step 3 with some special three-dimensional scenes, for the moving target with a constant velocity and a constant height, the constant height indicates that the pitch angle $\phi(k)\equiv 0$, and thus the special three-dimensional scenes are equivalent to two-dimensional scenes, the time-varying state-transition matrix and the time-varying noise-driven matrix are simplified below:

$$A_{CV-2D}(k) = \begin{bmatrix} 1 & T & 0 & 0 \\ 0 & 1 & 0 & 0 \\ 0 & 0 & 1 & T \\ 0 & 0 & 0 & 1 - T\frac{r(k\text{-}1)^f}{r(k\text{-}1)} \end{bmatrix},$$

$$B_{CV-2D}(k) = \begin{bmatrix} \frac{1}{2}T^2 & 0 \\ T & 0 \\ 0 & 0 \\ 0 & \frac{T}{r(k-1)} \end{bmatrix}.$$

In the step 3 with some special three-dimensional scenes, for the moving target with a constant acceleration and a constant height, the constant height indicates that the pitch angle $\phi(k)\equiv 0$, and thus the special three-dimensional scenes are equivalent to two-dimensional scenes, the time-varying state-transition matrix and the time-varying noise-driven matrix are simplified below:

$$A_{CA-2D}(k) = \begin{bmatrix} 1 & T & \frac{1}{2}T^2 & 0 & 0 & 0 \\ 0 & 1 & T & 0 & 0 & 0 \\ 0 & 0 & 1 & 0 & 0 & 0 \\ 0 & 0 & 0 & 1 & T & 0 \\ 0 & 0 & 0 & 0 & 1 & T \\ 0 & 0 & 0 & 0 & -\frac{Tr(k-1)''}{r(k-1)} & 1 - 2T\frac{r(k-1)'}{r(k-1)} \end{bmatrix}$$

$$B_{CA-2D}(k) = \begin{bmatrix} \frac{1}{6}T^3 & 0 \\ \frac{1}{2}T^2 & 0 \\ T & 0 \\ 0 & 0 \\ 0 & 0 \\ 0 & \frac{T}{r(k-1)} \end{bmatrix}.$$

Step 4: performing, based on the state equation at the moment k, one-step prediction on a state of the moving target at the moment k, thereby to obtain a prediction state of the moving target at the moment k and a prediction variance of the moving target at the moment k.

Specifically, the step 4 includes:

using the state equation at the moment k in the transformation state space to perform the one-step prediction on the state and a variance at the moment k, and equations of performing the one-prediction being expressed as follows:

$$\xi(k,k-1) = A_{CV}(k)\xi(k-1,k-1)$$

$$P(k,k-1) = A_{CV}(k)P(k-1,k-1)A_{CV}(k)^T + B_{CV}(k)D(u(k))B_{CV}(k)^T$$

where $\xi(k,k-1)$ and $P(k,k-1)$ respectively represent the prediction state of the moving target at the moment k and the prediction variance of the moving target at the moment k, and $D(u(k))$ represents a process noise covariance matrix at the moment k.

Step 5: performing dimension-expansion processing on a radar observation value interfered by noises at the moment k and a noise covariance matrix of the three-dimensional radar observation data at the moment k, thereby to obtain dimension-expansion data.

Specifically, the step 5 includes:

acquiring the observation data at the moment k of the three-dimensional detection radar, performing the dimension-expansion processing on a radar observation value interfered by noises and a noise covariance matrix at the moment k, and equations of performing the dimension-expansion processing being expressed as follows:

$$Z_e(k) = E\times Z(k)$$

$$R_e(k) = ER(k)E^T$$

where $$E = \begin{bmatrix} 1 & 0 & 0 \\ 0 & 0 & 0 \\ 0 & 1 & 0 \\ 0 & 0 & 0 \\ 0 & 0 & 1 \\ 0 & 0 & 0 \end{bmatrix}$$

represents a dimension-expansion matrix, $Z_e(k)$ represents a dimension-expansion vector, and $R_e(k)$ represents a covariance matrix of the dimension-expansion vector.

Step 6: performing fusion filtering on the prediction state of the moving target at the moment k and the dimension-expansion data based on a minimum variance estimation theory, thereby to obtain a posteriori estimation (the target estimation includes a target state estimation and a target state covariance) of the moving target at the moment k.

Specifically, the step 6 includes:

performing the fusion filtering on the prediction state of the moving target at the moment k and the dimension-expansion data based on the minimum variance estimation theory, thereby to obtain a posteriori state estimation and a posteriori state covariance of the moving target at the moment k, and equations of performing the fusion filtering being expressed as follows:

$$\xi(k,k)=(P(k,k-1)^{-1}R_e(k)^{-1})^{-1}(P(k,k-1)^{-1}\xi(k,k-1)+R_e(k)^{-1}Z_e(k))$$

$$P(k,k)=(P(k,k-1)^{-1}+R_e(k)^{-1})^{-1}.$$

In an exemplary embodiment, the method for tracking a moving target further includes: based on the posteriori estimation, determining a tracking result of the state of the moving target.

Step 7: progressing the moment k to a moment k+1 for further tracking of the moving target.

Specifically, the step 2 is performed to obtain an initial state of the moving target, in other words, a state of the moving target at moment k=1 is the initial state of the moving target. When the moment k>2, steps S3~S6 are repeated until the tracking of the moving target is completed. Although the tracking result is a state value in the transformation state space, the state of the moving target may be transformed to the three-dimensional Cartesian coordinate system if necessary.

In some embodiments, a specific method for transforming the state in step S7 to the three-dimensional Cartesian coordinate system is as follows:

assuming $\phi=\xi^{11}(k,k)$, $\phi'=\xi^{21}(k,k)$, $r=\xi^{31}(k,k)$, $r'=\xi^{41}(k,k)$, $\theta=\xi^{51}(k,k)$, and $\theta'=\xi^{61}(k,k)$; then obtaining following equations:

$$x(k)=r\cos(\phi)\cos(\theta)e^{(\sigma+\alpha)/2}$$

$$y(k)=r\cos(\phi)\sin(\theta)e^{(\sigma+\alpha)/2}$$

$$z(k)=r\sin(\phi)e^{\alpha/2}$$

$$v_\theta(k)=r\cos(\phi)\theta'e^{\alpha/2}$$

$$v_\phi(k)=r\phi'$$

$$x'(k)=-v_\theta\sin(\theta)e^{\sigma/2}+r'\cos(\phi)\cos(\theta)e^{(\sigma+\alpha)/2}+v_\phi\sin(\phi)\cos(\theta)e^{(\sigma+\alpha)/2})$$

$$y'(k)=v_\theta\cos(\theta)e^{\sigma/2}+r'\cos(\phi)\sin(\theta)e^{(\sigma+\alpha)/2}+v_\phi\sin(\phi)\sin(\theta)e^{(\sigma+\alpha)/2}$$

$$z'(k)=r'\sin(\phi)e^{\alpha/2}-v_\phi\cos(\phi)e^{\alpha/2}$$

where $\xi^{nm}(k,k)$ represent a state vector, $\xi(k,k)$ represent an element in row n and column m, $\alpha$ represents a variance of a pitch angle, and $\sigma$ represents a variance of an azimuth; x(k), y(k), z(k), x'(k), y'(k), and z'(k) respectively represent positions and velocities in the X, Y, and Z axes in the Cartesian coordinate system.

Figure 3:
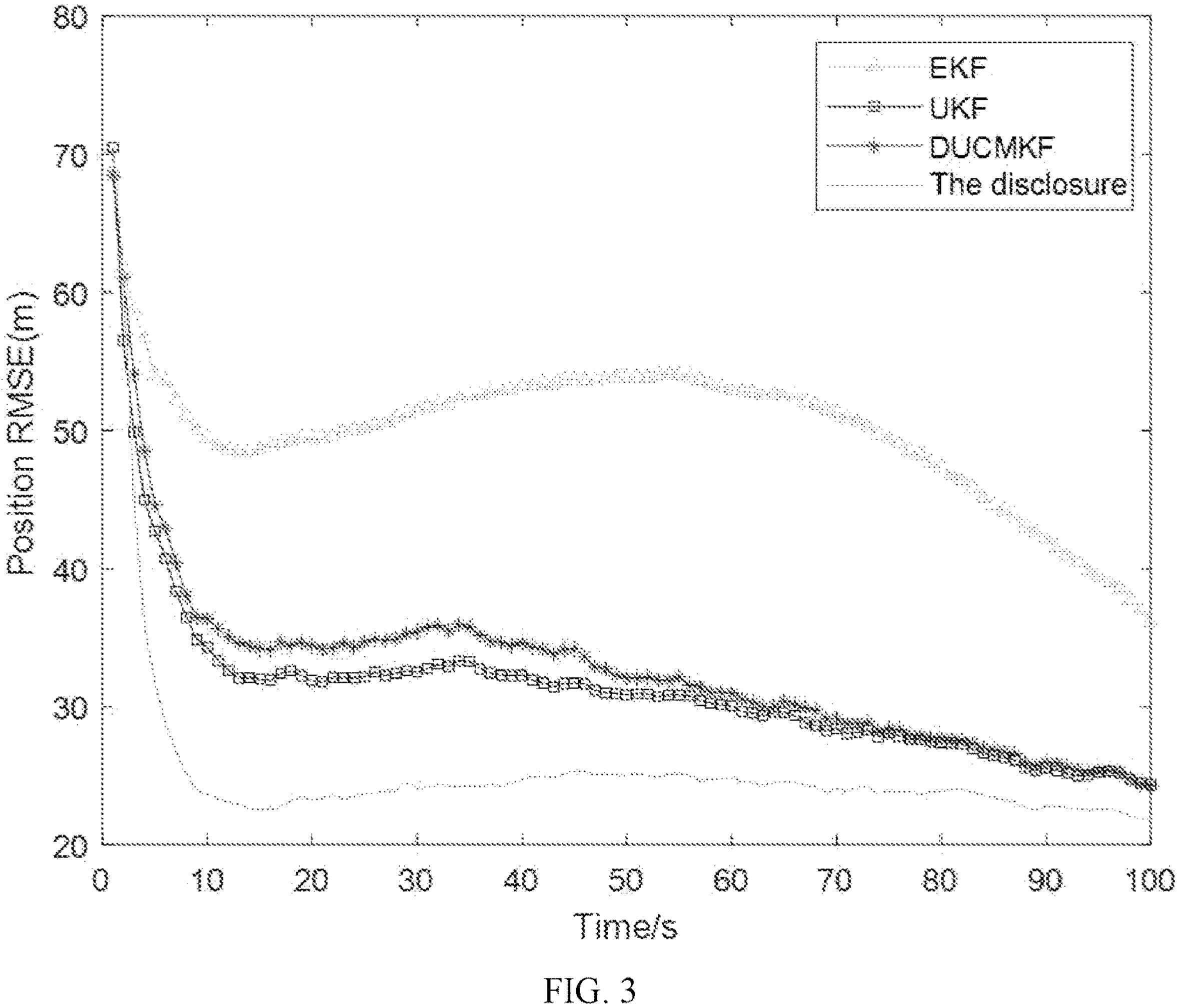
FIG. 3 illustrates a chart that compares the disclosure with three internationally recognized methods of extended Kalman filtering (EKF), unscented Kalman filtering (UKF), and decorrelating unbiased transformed measurement Kalman filtering (DUCMKF) with respect to position root mean square errors (RMSEs).
Figure 4:
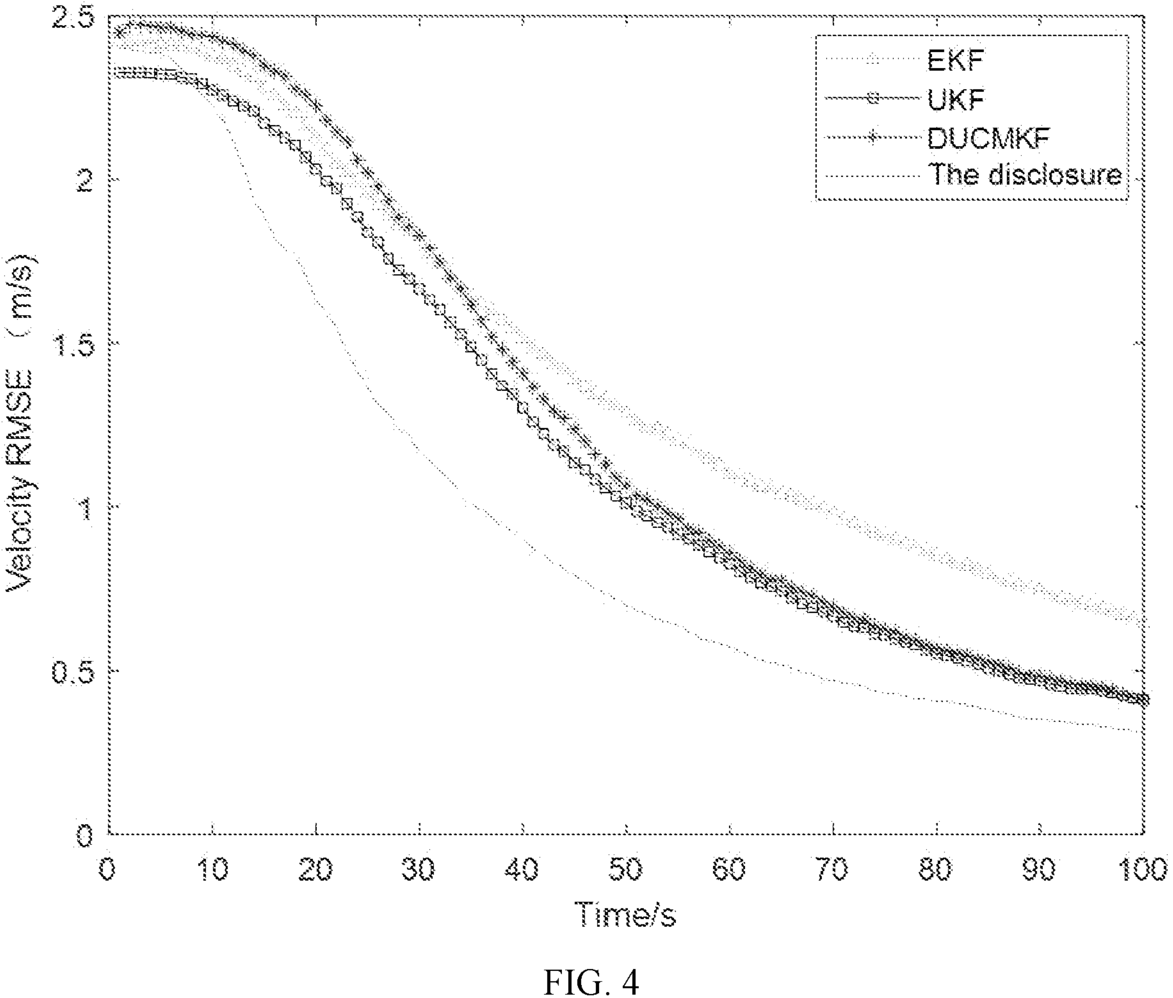
FIG. 4 illustrates a chart that compares the disclosure with three internationally recognized methods of EKF, UKF, and DUCMKF with respect to velocity RMSEs.

In an embodiment, a tracking system with a typical three-dimensional detection radar fixed at the coordinate origin. The radar can obtain a distance, an azimuth and a pitch angle of a moving target at each sampling moment. Observation noises of the radar include a distance error $\sigma_r$=40 m, an azimuth error $\sigma_\theta$=0.4 deg, and a pitch angle error $\sigma_\theta$=0.2 deg. For a scene that the radar is tracking a flying target in the air, an initial position of the flying target is (8 km, 8 km, 2 km), the radar sampling period is T=1 second (s), and an initial velocity of the flying target is (6 m/s, 8 m/s, 4 m/s), it is assumed that the process noises are all zero-mean white Gaussian noises with a standard error of 0.01 m/s. By simulation comparisons, a comparative result between the most effective methods in the related art and the method of the disclosure with respect to position and velocity RMSEs are shown in FIG. 3 and FIG. 4, and the smaller the RMSEs is, the higher the tracking accuracy is. The most effective methods in the related art and the method of the disclosure are all run through 500 Monte Carlo simulations.

Figure 5:
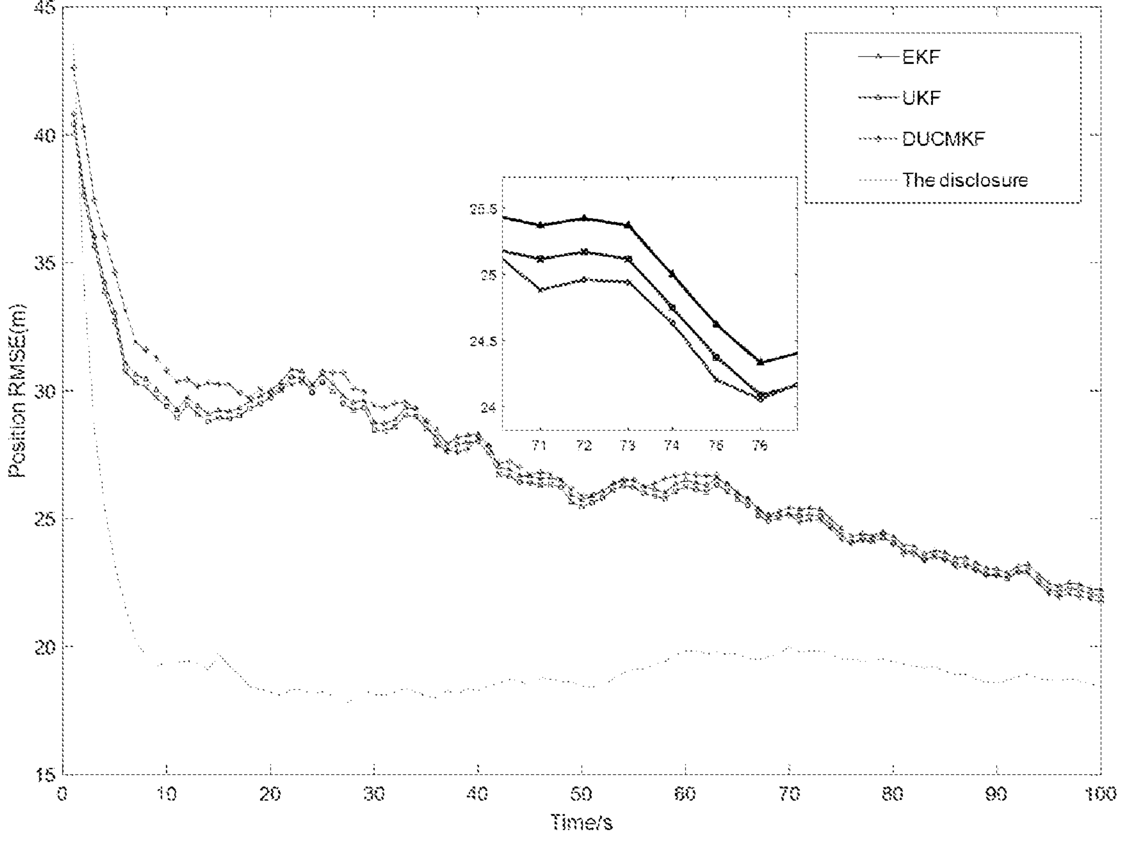
FIG. 5 illustrates a chart that compares the disclosure with three internationally recognized methods of EKF, UKF, and DUCMKF with respect to position RMSEs in a two-dimensional scene.
Figure 6:
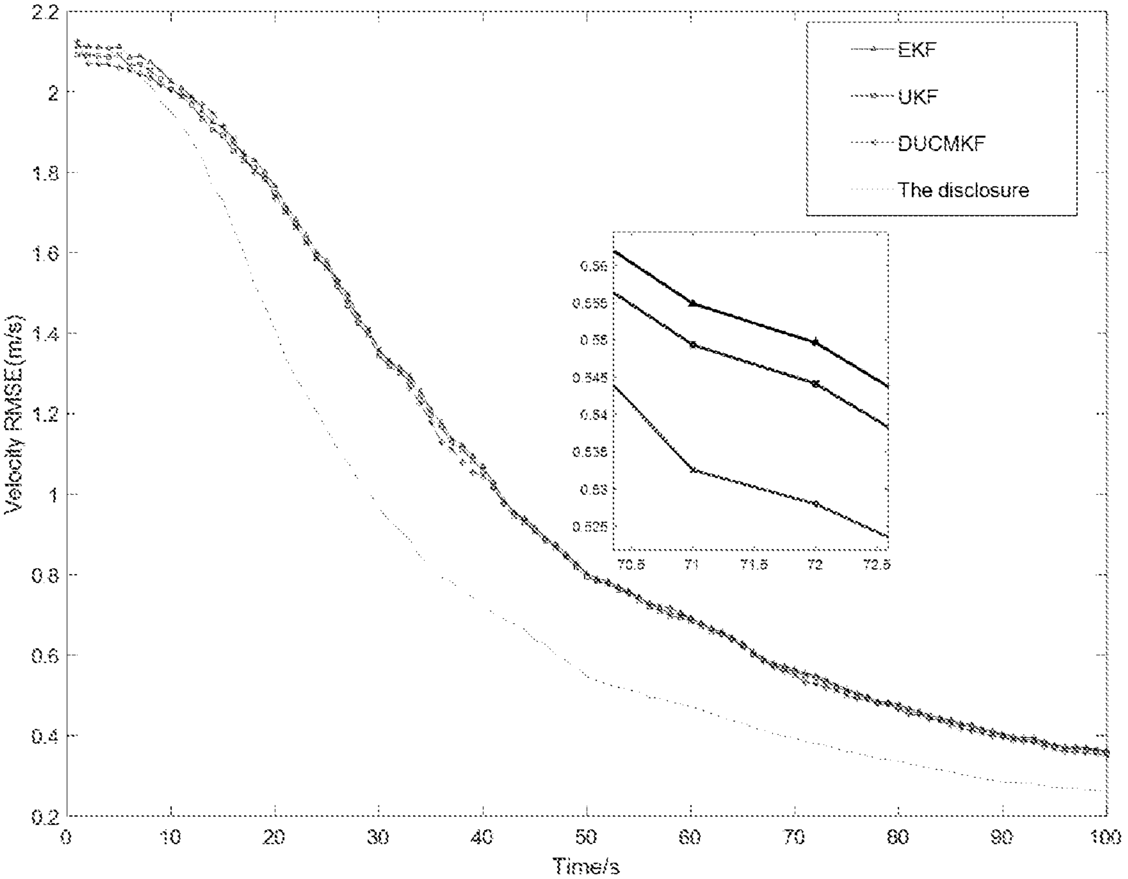
FIG. 6 illustrates a chart that compares the disclosure with three internationally recognized methods of EKF, UKF, and DUCMKF with respect to velocity RMSEs in a two-dimensional scene.

In an embodiment, a two-dimensional tracking scene as a three-dimensional special scene. In this scene, the target moves at an approximately constant velocity, the radar is located at the coordinate origin, an initial position of the target is (10 km, 10 km), and an initial velocity of the target is (6 m/s, 8 m/s). Observation noises of the radar includes a distance error being 50 m and an angle error being 0.5 degrees. By simulation comparisons, a comparative result between the most effective methods in the related art and the method of the disclosure with respect to position and velocity RMSEs are shown in FIG. 5 and FIG. 6, and the smaller the RMSEs is, the higher the tracking accuracy is. The most effective methods in the related art and the method of the disclosure are all run through 500 Monte Carlo simulations.

Figure 7:
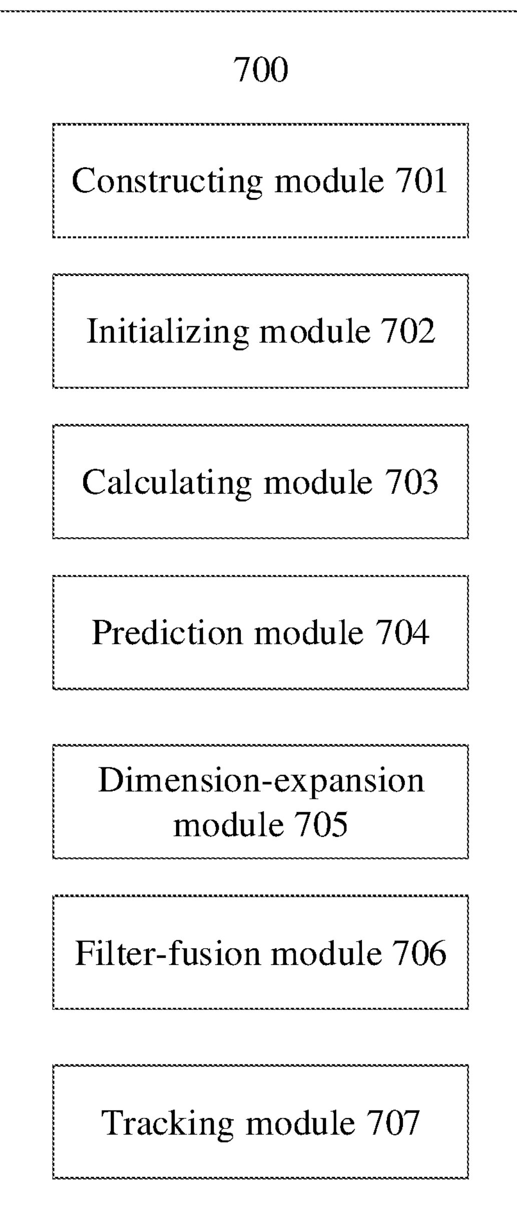
FIG. 7 illustrates a structural diagram of a device for tracking the moving target in the disclosure.

In an embodiment, a device for tracking a moving target is provide, and a structural diagram of the device is shown in FIG. 7. The device 700 includes:

a constructing module 701, configured to construct a state equation and an observation equation based on three-dimensional radar observation data;

an initializing module 702, configured to initialize a transforming state of the moving target to obtain an initial state of the moving target when k=1;

a calculating module 703, configured to calculate a time-varying state-transition matrix, a time-varying noise-driven matrix, and noise statistical characteristics of the state equation of a moment k based on a state of the moving target at a moment k−1;

a prediction module 704, configured to perform one-step prediction on a state of the moving target at the moment k based on the state equation at the moment k, thereby obtain a prediction state of the moving target at the moment k;

a dimension-expansion module 705, configured to acquire observation data at the moment k of a three-dimensional detection radar and perform dimension-expansion processing on the acquired observation data at the moment k of the three-dimensional detection radar, thereby to obtain dimension-expansion data;

a fusion filtering module 706, configured to perform fusion filtering on the prediction state of the moving target at the moment k and the dimension-expansion data based on a minimum variance estimation theory, thereby to obtain a posteriori estimation of the moving target at the moment k; and a tracking module 707, configured to progressing the moment k to a moment k+1 for further tracking of the moving target.

In some embodiments, the constructing module 701 is further configured for:

for the moving target with a constant velocity, using the three-dimensional radar observation data including a distance, an azimuth, a pitch angle, a first derivative of the distance, a first derivative of the azimuth, and a first derivative of the pitch angle (i.e., a distance, an azimuth, a pitch angle, a Doppler velocity, an azimuth angular velocity, and a pitch angular velocity) as parameters to construct a transformation state space; based on kinematic characteristics of the moving target with the constant velocity, using a radar tracking system to analyze the moving target with the constant velocity, thereby to construct the state equation and the observation equation in the transformation state space; the state equation and the observation equation being expressed as follows:

$$\xi(k)=A_{CV}(k)\cdot\xi(k-1)+B_{CV}(k)\cdot u(k)$$

$$Z(k)=H\cdot\xi(k)+w(k)$$

where $\xi(k)=[\phi(k)\ \phi'(k)\ r(k)\ r'(k)\ \theta(k)\ \theta'(k)]^T$ represents a state vector constructed directly from the three-dimensional radar observation data; $\phi(k)$, $\phi'(k)$, $r(k)$, $r'(k)$, $\theta(k)$, and $\theta'(k)$ respectively represent a pitch angle, a pitch angular velocity, a distance, a Doppler velocity, an azimuth, and an azimuth angular velocity of the moving target relative to the three-dimensional detection radar at the moment k; $A_{CV}(k)$, $B_{CV}(k)$, $u(k)$ and H respectively represent the time-varying state-transition matrix, the time-varying noise-driven matrix, a process noise, and an observation matrix; where $$u(k)=\left[v'_\phi(k)\ r''(k)\ v'_\theta(k)\right]^T,\ v'_\phi(k),\ r''(k)\ \text{and}\ v'_\theta(k)$$

respectively represent a process noise in a meridional direction, a process noise in a radial direction, and a process noise in an azimuthal direction; Z(k) represents a radar observation value interfered by noises at the moment k, including a distance, an azimuth, and a pitch angle of the moving target relative to the three-dimensional detection radar under interferences of the noises at the moment k; $w(k)=[\tilde{\phi}(k)\ \tilde{r}(k)\ \tilde{\theta}(k)]^T$ represents an observation noise of the three-dimensional detection radar at the moment k, where $\tilde{\phi}(k)$, $\tilde{r}(k)$ and $\tilde{\theta}(k)$ respectively represent a pitch angular noise, a distance noise, and an azimuth noise; $\tilde{\phi}(k)$, $\tilde{r}(k)$, and $\tilde{\theta}(k)$ are all white Gaussian noises with a mean value of zero; variances of the pitch angular noise, the distance noise, and the azimuth noise respectively are delta_ϕ, delta_r, and delta_θ; and a noise covariance matrix is expressed as follows:

$$R(k)=\begin{bmatrix}\text{delta\_}\phi & 0 & 0\\ 0 & \text{delta\_r} & 0\\ 0 & 0 & \text{delta\_}\theta\end{bmatrix}.$$

In some embodiment, the initializing module 702 is further configured for:

for the moving target, initializing a state $\xi(0)$ and a covariance P(0) of the moving target based on prior information of the moving target in a Cartesian coordinate system:

assuming $\xi(0)=[\phi(0)\ \phi'(0)\ r(0)\ r'(0)\ \theta(0)\ \theta'(0)]^T$, then $$\phi(0)=\arctan\left(\frac{z}{\sqrt{x^2+y^2}}\right)+p_\phi$$

$$v_\phi=\frac{x'xz}{\sqrt{x^2+y^2}\sqrt{x^2+y^2+z}}+\frac{y'yz}{\sqrt{x^2+y^2}\sqrt{x^2+y^2+z}}+\frac{z'\sqrt{x^2+y^2}}{\sqrt{x^2+y^2+z}}+p_{v_\phi}$$

$$\phi'(0)=v_\phi/r(0)$$

$$r(0)=\sqrt{x^2+y^2+z^2}+p_r$$

$$r'(0)=\frac{x'x}{\sqrt{x^2+y^2+z^2}}+\frac{y'y}{\sqrt{x^2+y^2+z^2}}+\frac{z'z}{\sqrt{x^2+y^2+z^2}}+p_{r'}$$

$$\theta(0)=\arctan(y/x)+p_\theta$$

$$\theta'(0)=-\frac{x'y}{\sqrt{x^2+y^2}}+\frac{y'x}{\sqrt{x^2+y^2}}+p_{\theta'}$$

$$P(0)=\begin{bmatrix}\sigma_\phi & 0 & 0 & 0 & 0 & 0\\ 0 & \frac{\sigma_{\phi'}}{r(0)^2}+\frac{\sigma_r v_{\phi'}^2}{r(0)^4} & 0 & 0 & 0 & 0\\ 0 & 0 & \sigma_r & 0 & 0 & 0\\ 0 & 0 & 0 & \sigma_{r'} & 0 & 0\\ 0 & 0 & 0 & 0 & \sigma_\theta & 0\\ 0 & 0 & 0 & 0 & 0 & \sigma_{\theta'}\end{bmatrix}$$

where $p_\phi$, $p_{v_\phi}$, $p_r$, $p_{r'}$, $p_\theta$, and $p_{\theta'}$ are all Gaussian distributions that follow a mean value of zero; and variances of $p_\phi$, $p_{v_\phi}$, $p_r$, $p_{r'}$, $p_\theta$, and $p_{\theta'}$ respectively are $\sigma_{v_\phi}$, $\sigma_{v_\phi'}$, $\sigma_r$, $\sigma_{r'}$, $\sigma_\theta$, and $\sigma_{\theta'}$.

In some embodiments, the prediction module 704 is further configured for:

using the state equation at the moment k in the transformation state space to perform the one-step prediction on the state and a variance at the moment k, and equations of performing the one-prediction being expressed as follows:

$$\xi(k,k-1)=A_{CV}(k)\xi(k-1,k-1)$$

$$P(k,k-1)=A_{CV}(k)P(k-1,k-1)A_{CV}(k)^T+B_{CV}(k)D(u(k))B_{CV}(k)^T$$

where $\xi(k,k-1)$ and $P(k,k-1)$ respectively represent the prediction state of the moving target at the moment k and the prediction variance of the moving target at the moment k, and D(u(k)) represents the process noise covariance matrix at the moment k.

In some embodiment, the dimension-expansion module 705 is further configured for:

acquiring the observation data at the moment k of the three-dimensional detection radar, performing the dimension-expansion processing on a radar observation value interfered by noises and a noise covariance matrix at the moment k, and equations of performing the dimension-expansion processing being expressed as follows:

$$Z_e(k)=E\times Z(k)$$

$$R_e(k)=ER(k)E^T$$

where $$E = \begin{bmatrix} 1 & 0 & 0 \\ 0 & 0 & 0 \\ 0 & 1 & 0 \\ 0 & 0 & 0 \\ 0 & 0 & 1 \\ 0 & 0 & 0 \end{bmatrix}$$

represents a dimension-expansion matrix, $Z_e(k)$ represents a dimension-expansion vector, and $R_e(k)$ represents a covariance matrix of the dimension-expansion vector.

In some embodiments, the fusion filtering module 706 is further configured for:

performing the fusion filtering on the prediction state of the moving target at the moment k and the dimension-expansion data based on the minimum variance estimation theory, thereby to obtain a posteriori state estimation and a posteriori state covariance of the moving target at the moment k, and equations of performing the fusion filtering being expressed as follows:

$$\xi(k,k)=(P(k,k-1)^{-1}+R_e(k)^{-1})^{-1}(P(k,k-1)^{-1}\xi(k,k-1)+R_e(k)^{-1}Z_e(k))$$

$$P(k,k)=(P(k,k-1)^{-1}+R_e(k)^{-1})^{-1}.$$

In some embodiments, the calculating module 703 is further configured for:

for the moving target with a constant velocity, using following equations to calculate parameters of the state equation and the observation equation at the moment k based on the posteriori estimation of the moving target at the moment k−1:

$$A_{CV}(k) = \begin{bmatrix} 1 & T & 0 & 0 & 0 & 0 \\ 0 & 1 - T\frac{r(k-1)'}{r(k-1)} & 0 & 0 & 0 & 0 \\ 0 & 0 & 1 & T & 0 & 0 \\ 0 & 0 & 0 & 1 & 0 & 0 \\ 0 & 0 & 0 & 0 & 1 & T \\ 0 & 0 & 0 & 0 & 0 & 1 + T\left(\tan\phi(k-1)\phi'(k-1) - \frac{r'(k-1)}{r(k-1)}\right) \end{bmatrix}$$

$$B_{CV}(k) = \begin{bmatrix} 0 & 0 & 0 \\ \frac{T}{r(k-1)} & 0 & 0 \\ 0 & \frac{1}{2}T^2 & 0 \\ 0 & T & 0 \\ 0 & 0 & 0 \\ 0 & 0 & \frac{T}{r(k-1)\cos\phi(k-1)} \end{bmatrix}$$

$$H = \begin{bmatrix} 1 & 0 & 0 & 0 & 0 & 0 \\ 0 & 0 & 1 & 0 & 0 & 0 \\ 0 & 0 & 0 & 0 & 1 & 0 \end{bmatrix}$$

$$D(u(k)) = G(k)QG(k)^T$$

$$G(k) = \begin{bmatrix} \cos\theta(k)\sin\phi(k) & \sin\theta(k)\sin\phi(k) & \cos\phi(k) \\ \cos\theta(k)\cos\phi(k) & \sin\theta\cos\phi & \sin\phi(k) \\ -\sin\theta(k) & \cos\theta(k) & 0 \end{bmatrix}$$

where, T represents a radar sampling interval time; r(k−1), r'(k−1), θ(k−1) and ϕ(k−1) respectively represent posteriori estimations of a distance, a Doppler velocity, an azimuth, and a pitch angle at the moment k−1; $Q=\mathrm{diag}(q_x\ q_y\ q_z)$ represents a process noise in a Cartesian coordinate system, and $q_x$, $q_y$, and $q_z$ respectively represent white Gaussian noise variances in X, Y, and Z axes; G(k) represents a process noise transition matrix at the moment k.

It should be noted that the device for tracking the moving target belongs to the same technical concept as the method for tracking the moving target, and it can achieve the same beneficial effect. It will not be repeated here.

In an embodiment, a system for tracking a moving target is provided, and the system includes: a memory configured to store a computer program and a processor configured to execute the computer program to implement the above method.

In an embodiment, a non-transitory computer-readable storage medium storing instructions is provided, the above method is executed when the instructions are executed by a processor.

Furthermore, although exemplary embodiments have been described herein, the scope of protection of the disclosure includes any embodiments having equivalent elements, modifications, omissions, combinations (e.g., combinations of various embodiments), adaptations, or changes based on the disclosure. The elements in the claims are to be interpreted broadly based on the language employed in the claims and are not to be limited to the exemplary embodiments described in this specification, the exemplary embodiments are to be interpreted as non-exclusive. Therefore, it is should be understood that the specification and exemplary embodiments are exemplary only, and a true scope and spirit are indicated by the appended claims and equivalents of the appended claims.

The above description is intended to be illustrative and not restrictive. For example, the above embodiment may be used in combination with each other. Other embodiments may be used by those of ordinary skill in the art based on the exemplary embodiments of the disclosure. In addition, in the above exemplary embodiments, various features may be grouped together to simplify the disclosure. This is not to be construed as an intention that features of the invention that are not claimed are essential to any claim. On the contrary, the subject matter of the disclosure may be less than all of features of a particular embodiment. Thus, the appended claims are hereby incorporated into the detailed description of embodiments as examples or embodiments, with each claim standing on its own as a separate embodiment, and these embodiments may be combined with one another in various combinations or permutations. The scope of the disclosure should be determined with reference to the appended claims and equivalents of the appended claims.

What is claimed is:

1. A method for tracking a moving target, executed by a three-dimensional detection radar and a processor, wherein the three-dimensional detection radar is stationary and fixed in a preset position, the method comprising:

step 1: constructing, by the processor, a state equation and an observation equation based on three-dimensional radar observation data, comprising:

for the moving target with a constant velocity, constructing, by the processor, the state equation and the observation equation in a state space; the state equation and the observation equation being expressed as follows:

$$\xi(k)=A_{CV}(k)\cdot\xi(k-1)+B_{CV}(k)\cdot u(k)$$

$$Z(k)=H\cdot\xi(k)+w(k)$$

where $\xi(k)=[\phi(k)\ \phi'(k)\ r(k)\ r'(k)\ \theta(k)\ \theta'(k)]^T$ represents a state vector constructed directly from the three-dimensional radar observation data; $\phi(k)$, $\phi'(k)$, $r(k)$, $r'(k)$, $\theta(k)$, and $\theta'(k)$ respectively represent a pitch angle, a pitch angular velocity, a distance, a Doppler velocity, an azimuth, and an azimuth angular velocity of the moving target relative to the three-dimensional detection radar at a moment k; $A_{CV}(k)$, $B_{CV}(k)$, u(k) and H respectively represent a time-varying state-transition matrix, a time-varying noise-driven matrix, a process noise, and an observation matrix; where $$u(k)=\left[v'_{\phi}(k)\ r''(k)\ v'_{\theta}(k)\right]^T,\ v'_{\phi}(k),\ r''(k)\text{ and }v'_{\theta}(k)$$

respectively represent a process noise in a meridional direction, a process noise in a radial direction, and a process noise in an azimuthal direction; Z(k) represents a radar observation value interfered by noises at the moment k, including a distance, an azimuth, and a pitch angle of the moving target relative to the three-dimensional detection radar under interferences of the noises at the moment k; $w(k)=[\tilde{\phi}(k)\ \tilde{r}(k)\ \tilde{\theta}(k)]^T$ represents an observation noise of the three-dimensional detection radar at the moment k, where $\tilde{\phi}(k)$, $\tilde{r}(k)$ and $\tilde{\theta}(k)$ respectively represent a pitch angular noise, a distance noise, and an azimuth noise; $\tilde{\phi}(k)$, $\tilde{r}(k)$, and $\tilde{\theta}(k)$ are all white Gaussian noises with a mean value of zero; variances of the pitch angular noise, the distance noise, and the azimuth noise respectively are delta_$\phi$, delta_r, and delta_$\theta$; a noise covariance matrix is expressed as follows:

$$R(k)=\begin{bmatrix}\text{delta\_}\phi & 0 & 0\\ 0 & \text{delta\_r} & 0\\ 0 & 0 & \text{delta\_}\theta\end{bmatrix},\text{ and }H=\begin{bmatrix}1&0&0&0&0&0\\0&0&1&0&0&0\\0&0&0&0&1&0\end{bmatrix};$$

step 2: initializing, by the processor, a transforming state of the moving target to obtain an initial state of the moving target when k=1;

step 3: calculating, by the processor, the time-varying state-transition matrix, the time-varying noise-driven matrix, and statistical characteristics of the process noise at the moment k based on the initial state of the moving target when k=2; and calculating, by the processor, the time-varying state-transition matrix, the time-varying noise-driven matrix, and the statistical characteristics of the process noise at the moment k based on a posteriori estimation of the moving target at a moment k−1 when k>2;

step 4: performing, by the processor and based on the state equation at the moment k, one-step prediction on a state of the moving target at the moment k, thereby to obtain a prediction state of the moving target at the moment k;

step 5: acquiring, by the three-dimensional detection radar, observation data at the moment k of the three-dimensional detection radar, and performing, by the processor, dimension-expansion processing on the acquired observation data at the moment k of the three-dimensional detection radar, thereby to obtain dimension-expansion data;

step 6: performing, by the processor, fusion filtering on the prediction state of the moving target at the moment k and the dimension-expansion data based on a minimum variance estimation theory, thereby to obtain a posteriori estimation of the moving target at the moment k;

step 7: progressing, by the processor and the three-dimensional detection radar, the moment k to a moment k+1 for further tracking of the moving target; and step 8: transforming, by the processor, the posteriori estimation of the moving target at the moment k to a three-dimensional Cartesian coordinate system to obtain positions of the moving target in X, Y, and Z axes in the three-dimensional Cartesian coordinate system and velocities of the moving target in the X, Y, and Z axes in the three-dimensional Cartesian coordinate system, and navigating, monitoring, controlling or attacking, by the processor and based on the positions of the moving target in X, Y, and Z axes in the three-dimensional Cartesian coordinate system and velocities of the moving target in the X, Y, and Z axes in the three-dimensional Cartesian coordinate system, the moving target, wherein the transforming, by the processor, the posteriori estimation of the moving target at the moment k to a three-dimensional Cartesian coordinate system to obtain positions of the moving target in X, Y, and Z axes in the three-dimensional Cartesian coordinate system and velocities of the moving target in the X, Y, and Z axes in the three-dimensional Cartesian coordinate system comprises:

assuming $\phi=\xi^{11}(k,k)$, $\phi'=\xi^{21}(k,k)$, $r=\xi^{31}(k,k)$, $r'=\xi^{41}(k,k)$, $\theta=\xi^{51}(k,k)$, and $\theta'=\xi^{61}(k,k)$; then obtaining the following equations:

$$x(k)=r\cos(\phi)\cos(\theta)e^{(\sigma+\alpha)/2}$$

$$y(k)=r\cos(\phi)\sin(\theta)e^{(\sigma+\alpha)/2}$$

$$z(k)=r\sin(\phi)e^{\alpha/2}$$

$$v_{\theta}(k)=r\cos(\phi)\theta' e^{\alpha/2}$$

$$v_{\phi}(k)=r\phi'$$

$$x'(k)=-v_{\theta}\sin(\theta)e^{\sigma/2}+r'\cos(\phi)\cos(\theta)e^{(\sigma+\alpha)/2}+v_{\phi}\sin(\phi)\cos(\theta)e^{(\sigma+\alpha)/2}$$

$$y'(k)=v_{\theta}\cos(\theta)e^{\sigma/2}+r'\cos(\phi)\sin(\theta)e^{(\sigma+\alpha)/2}+v_{\phi}\sin(\phi)\sin(\theta)e^{(\sigma+\alpha)/2}$$

$$z'(k)=r'\sin(\phi)e^{\alpha/2}-v_{\phi}\cos(\phi)e^{\alpha/2}$$

where $\xi(k,k)$ represents the posteriori state estimation of the moving target at the moment k, $\xi^{nm}(k,k)$ represents an element in row n and column m in $\xi(k,k)$, $\alpha$ represents a variance of the pitch angle, and $\sigma$ represents a variance of the azimuth; x(k), y(k), and z(k) respectively represent the positions of the moving target in the X, Y, and Z axes in the three-dimensional Cartesian coordinate system; and x'(k), y'(k), and z'(k) respectively represent the velocities of the moving target in X, Y, and Z axes in the three-dimensional Cartesian coordinate system.

2. The method for tracking the moving target as claimed in claim 1, wherein the initializing, by the processor, the transforming state of the moving target to obtain the initial state of the moving target when k=1 comprises:

for the moving target, initializing, by the processor, a state $\xi(0)$ and a covariance P(0) of the moving target based on prior information of the moving target in the three-dimensional Cartesian coordinate system:

assuming $\xi(0)=[\phi(0)\ \phi'(0)\ r(0)\ r'(0)\ \theta(0)\ \theta'(0)]^T$, then $$\phi(0)=\arctan\left(\frac{z}{\sqrt{x^2+y^2}}\right)+p_\phi$$

$$v_\phi=\frac{x'xz}{\sqrt{x^2+y^2}\sqrt{x^2+y^2+z}}+\frac{y'yz}{\sqrt{x^2+y^2}\sqrt{x^2+y^2+z}}+\frac{z'\sqrt{x^2+y^2}}{\sqrt{x^2+y^2+z}}+p_{v_\phi}$$

$$\phi'(0)=v_\phi/r(0)$$

$$r(0)=\sqrt{x^2+y^2+z^2}+p_r$$

$$r'(0)=\frac{x'x}{\sqrt{x^2+y^2+z^2}}+\frac{y'y}{\sqrt{x^2+y^2+z^2}}+\frac{z'z}{\sqrt{x^2+y^2+z^2}}+p_{r'}$$

$$\theta(0)=\arctan(y/x)+p_\theta$$

$$\theta'(0)=-\frac{x'y}{\sqrt{x^2+y^2}}+\frac{y'x}{\sqrt{x^2+y^2}}+p_{\theta'}$$

$$P(0)=\begin{bmatrix}\sigma_\phi & 0 & 0 & 0 & 0 & 0\\ 0 & \frac{\sigma_{\phi'}}{r(0)^2}+\frac{\sigma_r v_{\phi'}^2}{r(0)^4} & 0 & 0 & 0 & 0\\ 0 & 0 & \sigma_r & 0 & 0 & 0\\ 0 & 0 & 0 & \sigma_{r'} & 0 & 0\\ 0 & 0 & 0 & 0 & \sigma_\theta & 0\\ 0 & 0 & 0 & 0 & 0 & \sigma_{\theta'}\end{bmatrix}$$

where $p_\phi$, $p_{v_\phi}$, $p_r$, $p_{r'}$, $p_\theta$, and $p_{\theta'}$ are all Gaussian distributions that follow a mean value of zero; and variances of $p_\phi$, $p_{v_\phi}$, $p_r$, $p_{r'}$, $p_\theta$, and $p_{\theta'}$ respectively are $\sigma_{v_\phi}$, $\sigma_{v_\phi}'$, $\sigma_r$, $\sigma_{r'}$, $\sigma_\theta$, and $\sigma_{\theta'}$.

3. The method for tracking the moving target as claimed in claim 1, wherein the performing, by the processor and based on the state equation at the moment k, the one-step prediction on the state of the moving target at the moment k, thereby to obtain the prediction state of the moving target at the moment k comprises:

using, by the processor, the state equation at the moment k in the transformation state space to perform the one-step prediction on the state and a variance at the moment k, and equations of performing the one-prediction being expressed as follows:

$$\xi(k,k-1)=A_{CV}(k)\xi(k-1,k-1)$$

$$P(k,k-1)=A_{CV}(k)P(k-1,k-1)A_{CV}(k)^T+B_{CV}(k)D(u(k))B_{CV}(k)^T$$

where $\xi(k,k-1)$ and $P(k,k-1)$ respectively represent the prediction state of the moving target at the moment k and the prediction variance of the moving target at the moment k, and $D(u(k))$ represents a process noise covariance matrix at the moment k.

4. The method for tracking the moving target as claimed in claim 1, wherein the acquiring, by the three-dimensional detection radar, the observation data at the moment k of the three-dimensional detection radar, and performing, by the processor, the dimension-expansion processing on the acquired observation data at the moment k of the three-dimensional detection radar, thereby to obtain the dimension-expansion data comprises:

acquiring, by the three-dimensional detection radar, the observation data at the moment k of the three-dimensional detection radar, performing, by the processor, the dimension-expansion processing on the radar observation value interfered by noises and the noise covariance matrix at the moment k, and equations of performing the dimension-expansion processing being expressed as follows:

$$Z_e(k)=E\times Z(k)$$

$$R_e(k)=ER(k)E^T$$

where $$E=\begin{bmatrix}1 & 0 & 0\\ 0 & 0 & 0\\ 0 & 1 & 0\\ 0 & 0 & 0\\ 0 & 0 & 1\\ 0 & 0 & 0\end{bmatrix}$$

represents a dimension-expansion matrix, $Z_e(k)$ represents a dimension-expansion vector, and $R_e(k)$ represents a covariance matrix of the dimension-expansion vector.

5. The method for tracking the moving target as claimed in claim 1, wherein the performing, by the processor, the fusion filtering on the prediction state at the moment k and the dimension-expansion data based on the minimum variance estimation theory, thereby to obtain the posteriori estimation of the moving target at the moment k comprises:

performing, by the processor, the fusion filtering on the prediction state of the moving target at the moment k and the dimension-expansion data based on the minimum variance estimation theory, thereby to obtain a posteriori state estimation and a posteriori state covariance of the moving target at the moment k, and equations of performing the fusion filtering being expressed as follows:

$$\xi(k,k)=(P(k,k-1)^{-1}+R_e(k)^{-1})^{-1}(P(k,k-1)^{-1}\xi(k,k-1)+R_e(k)^{-1}Z_e(k))$$

$$P(k,k)=(P(k,k-1)^{-1}+R_e(k)^{-1})^{-1}.$$

6. The method for tracking the moving target as claimed in claim 1, wherein the calculating, by the processor, the time-varying state-transition matrix, the time-varying noise-driven matrix, and the statistical characteristics of the process noise at the moment k based on the initial state of the moving target when k=2; and calculating, by the processor, the time-varying state-transition matrix, the time-varying noise-driven matrix, and the statistical characteristics of the process noise at the moment k based on the posteriori estimation of the moving target at the moment k−1 when k>2:

for the moving target with a constant velocity, using, by the processor, following equations to calculate parameters of the state equation and the observation equation at the moment k based on the posteriori estimation of the moving target at the moment k−1:

$$A_{CV}(k)=\begin{bmatrix}1 & T & 0 & 0 & 0 & 0\\ 0 & 1-T\frac{r(k-1)'}{r(k-1)} & 0 & 0 & 0 & 0\\ 0 & 0 & 1 & T & 0 & 0\\ 0 & 0 & 0 & 1 & 0 & 0\\ 0 & 0 & 0 & 0 & 1 & T\\ 0 & 0 & 0 & 0 & 0 & 1+T\left(\tan\phi(k-1)\phi'(k-1)-\frac{r'(k-1)}{r(k-1)}\right)\end{bmatrix}$$

-continued $$B_{CV}(k)=\begin{bmatrix}0&0&0\\ \frac{T}{r(k-1)}&0&0\\ 0&\frac{1}{2}T^2&0\\ 0&T&0\\ 0&0&0\\ 0&0&\frac{T}{r(k-1)\cos\phi(k-1)}\end{bmatrix}$$

$$H=\begin{bmatrix}1&0&0&0&0&0\\0&0&1&0&0&0\\0&0&0&0&1&0\end{bmatrix}$$

$$D(u(k))=G(k)QG(k)^T$$

$$G(k)=\begin{bmatrix}\cos\theta(k)\sin\phi(k)&\sin\theta(k)\sin\phi(k)&\cos\phi(k)\\ \cos\theta(k)\cos\phi(k)&\sin\theta\cos\phi&\sin\phi(k)\\ -\sin\theta(k)&\cos\theta(k)&0\end{bmatrix}$$

where, T represents a radar sampling interval time; r(k−1), r'(k−1), θ(k−1) and ϕ(k−1) respectively represent posteriori estimations of a distance, a Doppler velocity, an azimuth, and a pitch angle at the moment k−1; Q=diag ($q_x$ $q_y$ $q_z$) represents a process noise in the three-dimensional Cartesian coordinate system, and $q_x$, $q_y$, and $q_z$ respectively represent white Gaussian noise variances in the X, Y, and Z axes; G(k) represents a process noise transition matrix at the moment k; and D(u(k)) represents a process noise covariance matrix at the moment k.

7. A system for tracking a moving target, wherein the system comprises:

a memory, configured to store a computer program; and the processor, configured to execute the computer program to implement the method as claimed in claim 1.

8. A non-transitory computer-readable storage medium storing instructions, wherein the method as claimed in claim 1 is executed when the instructions are executed by the processor.

9. The method for tracking the moving target as claimed in claim 1, wherein the moving target is an aircraft, and the method further comprises: navigating, monitoring, controlling or attacking the aircraft by the processor based on the positions of the moving target in X, Y, and Z axes in the three-dimensional Cartesian coordinate system and velocities of the moving target in the X, Y, and Z axes in the three-dimensional Cartesian coordinate system.

10. A method for tracking a moving target, executed by a three-dimensional detection radar and a processor, the method comprising:

constructing, by the processor, a state equation and an observation equation based on three-dimensional radar observation data, comprising:

for the moving target with a constant velocity, constructing, by the processor, the state equation and the observation equation in a transformation state space; the state equation and the observation equation being expressed as follows:

$$\xi(k)=A_{CV}(k)\cdot\xi(k-1)+B_{CV}(k)\cdot u(k)$$

$$Z(k)=H\cdot\xi(k)+w(k)$$

where $\xi(k)=[\phi(k)\ \phi'(k)\ r(k)\ r'(k)\ \theta(k)\ \theta'(k)]^T$ represents a state vector constructed directly from the three-dimensional radar observation data; ϕ(k), ϕ'(k),r(k), r'(k), θ(k), and θ'(k) respectively represent a pitch angle, a pitch angular velocity, a distance, a Doppler velocity, an azimuth, and an azimuth angular velocity of the moving target relative to the three-dimensional detection radar at a moment k; $A_{CV}(k)$, $B_{CV}(k)$, u(k) and H respectively represent a time-varying state-transition matrix, a time-varying noise-driven matrix, a process noise, and an observation matrix; where $$u(k)=\left[v'_\phi(k)\,r''(k)\,v'_\theta(k)\right]^T,\ v'_\phi(k),\ r''(k)\text{ and }v'_\theta(k)$$

respectively represent a process noise in a meridional direction, a process noise in a radial direction, and a process noise in an azimuthal direction; Z(k) represents a radar observation value interfered by noises at the moment k, including a distance, an azimuth, and a pitch angle of the moving target relative to the three-dimensional detection radar under interferences of the noises at the moment k; $w(k)=[\tilde{\phi}(k)\ \tilde{r}(k)\ \tilde{\theta}(k)]^T$ represents an observation noise of the three-dimensional detection radar at the moment k, where $\tilde{\phi}(k)$, $\tilde{r}(k)$ and $\tilde{\theta}(k)$ respectively represent a pitch angular noise, a distance noise, and an azimuth noise; $\tilde{\phi}(k)$, $\tilde{r}(k)$, and $\tilde{\theta}(k)$ are all white Gaussian noises with a mean value of zero; variances of the pitch angular noise, the distance noise, and the azimuth noise respectively are delta_ϕ, delta_r, and delta_θ; and a noise covariance matrix is expressed as follows:

$$R(k)=\begin{bmatrix}\text{delta\_}\phi&0&0\\0&\text{delta\_r}&0\\0&0&\text{delta\_}\theta\end{bmatrix};$$

initializing, by the processor, a transforming state of the moving target to obtain an initial state of the moving target when k=1;

calculating, by the processor, the time-varying state-transition matrix, the time-varying noise-driven matrix, and statistical characteristics of a process noise at the moment k based on the initial state of the moving target when k=2; and calculating the time-varying state-transition matrix, the time-varying noise-driven matrix, and statistical characteristics of a process noise at the moment k based on a posteriori estimation of the moving target at a moment k−1 when k>2;

performing, by the processor and based on the state equation at the moment k, one-step prediction on a state of the moving target at the moment k, thereby to obtain a prediction state of the moving target at the moment k;

acquiring, by the three-dimensional detection radar, observation data at the moment k of the three-dimensional detection radar, and performing, by the processor, dimension-expansion processing on the acquired observation data at the moment k of the three-dimensional detection radar, thereby to obtain dimension-expansion data;

performing, by the processor, fusion filtering on the prediction state of the moving target at the moment k and the dimension-expansion data based on a minimum variance estimation theory, thereby to obtain a posteriori estimation of the moving target at the moment k, comprising:

performing, by the processor, the fusion filtering on the prediction state of the moving target at the moment k and the dimension-expansion data based on the minimum variance estimation theory, thereby to obtain a posteriori state estimation and a posteriori state covariance of the moving target at the moment k, and equations of performing the fusion filtering being expressed as follows:

$$\xi(k,k)=(P(k,k-1)^{-1}+R_e(k)^{-1})^{-1}(P(k,k-1)^{-1}\xi(k,k-1)+R_e(k)^{-1}Z_e(k))$$

$$P(k,k)=(P(k,k-1)^{-1}+R_e(k)^{-1})^{-1}$$

where $\xi(k,k-1)$ and $P(k,k-1)$ respectively represent the prediction state of the moving target at the moment k and a prediction variance of the moving target at the moment k; $\xi(k,k)$ and $P(k,k)$ respectively represent the posteriori state estimation and the posteriori state covariance of the moving target at the moment k; $Z_e(k)$ represents a dimension-expansion vector, and $R_e(k)$ represents a covariance matrix of the dimension-expansion vector; and transforming, by the processor, the posteriori estimation of the moving target at the moment k to a three-dimensional Cartesian coordinate system, comprising: assuming $\phi=\xi^{11}(k,k)$, $\phi'=\xi^{21}(k,k)$, $r=\xi^{31}(k,k)$, $r'=\xi^{41}(k,k)$, $\theta=\xi^{51}(k,k)$, and $\theta'=\xi^{61}(k,k)$; then obtaining the following equations:

$$x(k)=r\cos(\phi)\cos(\theta)e^{(\sigma+\alpha)/2}$$

$$y(k)=r\cos(\phi)\sin(\theta)e^{(\sigma+\alpha)/2}$$

$$z(k)=r\sin(\phi)e^{\alpha/2}$$

$$v_\theta(k)=r\cos(\phi)\theta' e^{\alpha/2}$$

$$v_\phi(k)=r\phi'$$

$$x'(k)=-v_\theta\sin(\theta)e^{\sigma/2}+r'\cos(\phi)\cos(\theta)e^{(\sigma+\alpha)/2}+v_\phi\sin(\phi)\cos(\theta)e^{(\sigma+\alpha)/2})$$

$$y'(k)=v_\theta\cos(\theta)e^{\sigma/2}+r'\cos(\phi)\sin(\theta)e^{(\sigma+\alpha)/2}+v_\phi\sin(\phi)\sin(\theta)e^{(\sigma+\alpha)/2}$$

$$z'(k)=r'\sin(\phi)e^{\alpha/2}-v_\phi\cos(\phi)e^{\alpha/2}$$

where $\xi(k,k)$ represents a state vector, $\xi^{nm}(k,k)$ represents an element in row n and column m of the state vector, $\alpha$ represents a variance of the pitch angle, and $\sigma$ represents a variance of the azimuth; x(k), y(k), and z(k) respectively represent positions of the moving target in X, Y, and Z axes in the three-dimensional Cartesian coordinate system; and x'(k), y'(k), and z'(k) respectively represent velocities of the moving target in the X, Y, and Z axes in the three-dimensional Cartesian coordinate system; and attacking, by the processor and based on the positions of the moving target in X, Y, and Z axes in the three-dimensional Cartesian coordinate system and velocities of the moving target in the X, Y, and Z axes in the three-dimensional Cartesian coordinate system, the moving target, thereby achieving accurate attack for the moving target.

11. A method for tracking a moving target, executed by a three-dimensional detection radar and a processor, the method comprising:

step 1: constructing, by the processor, a state equation and an observation equation based on three-dimensional radar observation data, comprising:

for the moving target with a constant velocity, constructing, by the processor, the state equation and the observation equation in a transformation state space; the state equation and the observation equation being expressed as follows:

$$\xi(k)=A_{CV}(k)\cdot\xi(k-1)+B_{CV}(k)\cdot u(k)$$

$$Z(k)=H\cdot\xi(k)+w(k)$$

where $\xi(k)=[\phi(k)\ \phi'(k)\ r(k)\ r'(k)\ \theta(k)\ \theta'(k)]'$ represents a state vector constructed directly from the three-dimensional radar observation data; $\phi(k)$, $\phi'(k)$, r(k), r'(k), $\theta(k)$, and $\theta'(k)$ respectively represent a pitch angle, a pitch angular velocity, a distance, a Doppler velocity, an azimuth, and an azimuth angular velocity of the moving target relative to the three-dimensional detection radar at a moment k; $A_{CV}(k)$, $B_{CV}(k)$, u(k) and H respectively represent a time-varying state-transition matrix, a time-varying noise-driven matrix, a process noise, and an observation matrix; where $$u(k)=\left[v'_\phi(k)\ r''(k)\ v'_\theta(k)\right]^T,\ v'_\phi(k),\ r''(k)\ \text{and}\ v'_\theta(k)$$

respectively represent a process noise in a meridional direction, a process noise in a radial direction, and a process noise in an azimuthal direction; Z(k) represents a radar observation value interfered by noises at the moment k, including a distance, an azimuth, and a pitch angle of the moving target relative to the three-dimensional detection radar under interferences of the noises at the moment k; $w(k)=[\tilde{\phi}(k)\ \tilde{r}(k)\ \tilde{\theta}(k)]^T$ represents an observation noise of the three-dimensional detection radar at the moment k, where $\tilde{\phi}(k)$, $\tilde{r}(k)$ and $\tilde{\theta}(k)$ respectively represent a pitch angular noise, a distance noise, and an azimuth noise; $\tilde{\phi}(k)$, $\tilde{r}(k)$, and $\tilde{\theta}(k)$ are all white Gaussian noises with a mean value of zero; variances of the pitch angular noise, the distance noise, and the azimuth noise respectively are delta_$\phi$, delta_r, and delta_$\theta$; and a noise covariance matrix is expressed as follows:

$$R(k)=\begin{bmatrix}\text{delta\_}\phi & 0 & 0\\ 0 & \text{delta\_r} & 0\\ 0 & 0 & \text{delta\_}\theta\end{bmatrix};$$

step 2: initializing, by the processor, a transforming state of the moving target to obtain an initial state of the moving target when k=1;

step 3: calculating, by the processor, the time-varying state-transition matrix, the time-varying noise-driven matrix, and statistical characteristics of the process noise at the moment k based on the initial state of the moving target when k=2; and calculating the time-varying state-transition matrix, the time-varying noise-driven matrix, and the statistical characteristics of the process noise at the moment k based on a posteriori estimation of the moving target at a moment k−1 when k>2;

step 4: performing, by the processor and based on the state equation at the moment k, one-step prediction on a state of the moving target at the moment k, thereby to obtain a prediction state of the moving target at the moment k;

step 5: acquiring, by the three-dimensional detection radar, observation data at the moment k of the three-dimensional detection radar, and performing, by the processor, dimension-expansion processing on the acquired observation data at the moment k of the three-dimensional detection radar, thereby to obtain dimension-expansion data;

step 6: performing, by the processor, fusion filtering on the prediction state of the moving target at the moment k and the dimension-expansion data based on a minimum variance estimation theory, thereby to obtain a posteriori estimation of the moving target at the moment k, comprising:

performing, by the processor, the fusion filtering on the prediction state of the moving target at the moment k and the dimension-expansion data based on the minimum variance estimation theory, thereby to obtain a posteriori state estimation and a posteriori state covariance of the moving target at the moment k, and equations of performing the fusion filtering being expressed as follows:

$$\xi(k,k)=(P(k,k-1)^{-1}+R_e(k)^{-1})^{-1}(P(k,k-1)^{-1}\xi(k,k-1)+R_e(k)^{-1}Z_d(k))$$

$$P(k,k)=(P(k,k-1)^{-1}+R_e(k)^{-1})^{-1}$$

where $\xi(k,k-1)$ and $P(k,k-1)$ respectively represent the prediction state of the moving target at the moment k and a prediction variance of the moving target at the moment k; $\xi(k,k)$ and $P(k,k)$ respectively represent the posteriori state estimation and the posteriori state covariance of the moving target at the moment k; $Z_e(k)$ represents a dimension-expansion vector, and $R_e(k)$ represents a covariance matrix of the dimension-expansion vector;

step 7: progressing, by the processor and the three-dimensional detection radar, the moment k to a moment k+1 for further tracking of the moving target; and step 8: transforming, by the processor, the posteriori estimation of the moving target at the moment k to a three-dimensional Cartesian coordinate system to obtain positions of the moving target in X, Y, and Z axes in the three-dimensional Cartesian coordinate system and velocities of the moving target in the X, Y, and Z axes in the three-dimensional Cartesian coordinate system, and navigating, monitoring, controlling or attacking, by the processor and based on the positions of the moving target in X, Y, and Z axes in the three-dimensional Cartesian coordinate system and velocities of the moving target in the X, Y, and Z axes in the three-dimensional Cartesian coordinate system, the moving target, wherein the transforming, by the processor, the posteriori estimation of the moving target at the moment k to a three-dimensional Cartesian coordinate system to obtain positions of the moving target in X, Y, and Z axes in the three-dimensional Cartesian coordinate system and velocities of the moving target in the X, Y, and Z axes in the three-dimensional Cartesian coordinate system comprises:

assuming $\phi=\xi^{11}(k,k)$, $\phi'=\xi^{21}(k,k)$, $r=\xi^{31}(k,k)$, $r'=\xi^{41}(k,k)$, $\theta=\xi^{51}(k,k)$, and $\theta'=\xi^{61}(k,k)$; then obtaining the following equations:

$$x(k)=r\cos(\phi)\cos(\theta)e^{(\sigma+\alpha)/2}$$

$$y(k)=r\cos(\phi)\sin(\theta)e^{(\sigma+\alpha)/2}$$

$$z(k)=r\sin(\phi)e^{\alpha/2}$$

$$v_\theta(k)=r\cos(\phi)\theta' e^{\alpha/2}$$

$$v_\phi(k)=r\phi'$$

$$x'(k)=-v_\theta\sin(\theta)e^{\sigma/2}+r'\cos(\phi)\cos(\theta)e^{(\sigma+\alpha)/2}+v_\phi\sin(\phi)\cos(\theta)e^{(\sigma+\alpha)/2}$$

$$y'(k)=v_\theta\cos(\theta)e^{\sigma/2}+r'\cos(\phi)\sin(\theta)e^{(\sigma+\alpha)/2}+v_\phi\sin(\phi)\sin(\theta)e^{(\sigma+\alpha)/2}$$

$$z'(k)=r'\sin(\phi)e^{\alpha/2}-v_\phi\cos(\phi)e^{\alpha/2}$$

where $\xi(k,k)$ represents the posteriori state estimation of the moving target at the moment k, $\xi^{nm}(k,k)$ represents an element in row n and column m in $\xi(k,k)$, $\alpha$ represents a variance of the pitch angle, and $\sigma$ represents a variance of the azimuth; x(k), y(k), and z(k) respectively represent the positions of the moving target in the X, Y, and Z axes in the three-dimensional Cartesian coordinate system; and x'(k), y'(k), and z'(k) respectively represent the velocities of the moving target in X, Y, and Z axes in the three-dimensional Cartesian coordinate system.

* * * * *